US007984027B2

(12) United States Patent
Tamura

(10) Patent No.: US 7,984,027 B2
(45) Date of Patent: Jul. 19, 2011

(54) IMAGE PROCESSING APPARATUS, DOCUMENT MANAGEMENT SERVER, DOCUMENT MANAGEMENT SYSTEM, AND DOCUMENT MANAGEMENT CONTROL METHOD

(75) Inventor: Makiya Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 11/621,778

(22) Filed: Jan. 10, 2007

(65) Prior Publication Data
US 2007/0185885 A1 Aug. 9, 2007

(30) Foreign Application Priority Data

Jan. 24, 2006 (JP) ................................. 2006-014924

(51) Int. Cl.
*G06F 17/30* (2006.01)
(52) U.S. Cl. ........ 707/694; 707/687; 715/200; 715/202; 715/209; 715/229; 709/201; 709/203; 358/1.1; 358/401; 358/403
(58) Field of Classification Search .................. 707/687, 707/694, 10; 715/200, 202, 209, 229; 709/201, 709/203; 358/1.1, 401, 403
See application file for complete search history.

(56) References Cited

U.S. PATENT DOCUMENTS

| 5,761,404 | A  | * | 6/1998  | Murakami et al. ............... 714/15 |
| 5,813,009 | A  | * | 9/1998  | Johnson et al. ........................ 1/1 |
| 6,192,165 | B1 | * | 2/2001  | Irons ............................. 382/306 |
| 6,625,335 | B1 | * | 9/2003  | Kanai ........................... 382/306 |
| 6,640,244 | B1 | * | 10/2003 | Bowman-Amuah ........... 709/207 |
| 7,496,848 | B2 | * | 2/2009  | Hasebe et al. ................ 715/741 |
| 7,586,633 | B2 | * | 9/2009  | Urabe ........................... 358/1.15 |
| 7,746,490 | B2 | * | 6/2010  | Sawada ......................... 358/1.14 |
| 2002/0030849 | A1 | * | 3/2002  | Takamiya .................... 358/1.15 |
| 2002/0083187 | A1 | * | 6/2002  | Sim et al. ...................... 709/235 |
| 2004/0179224 | A1 | * | 9/2004  | Kidokoro ..................... 358/1.14 |
| 2004/0184066 | A1 | * | 9/2004  | Urabe ........................... 358/1.14 |
| 2004/0212826 | A1 | * | 10/2004 | Kashiwazaki ............... 358/1.15 |

(Continued)

FOREIGN PATENT DOCUMENTS

JP 2005-039411 A 2/2005

OTHER PUBLICATIONS

Konica Minolta Introduces the bizhub(TM) C250 Color Printer/ Copier/ Scanner/Fax and the bizhub C250P Printer, PR Newswire. New York: Sep. 1, 2005. p. 1.*

(Continued)

*Primary Examiner* — Frantz Coby
(74) *Attorney, Agent, or Firm* — Canon U.S.A., Inc. IP Division

(57) ABSTRACT

An image processing apparatus communicates with a document management server and a client apparatus. The image processing apparatus receives document entity data and document property information required for determining accessibility to the document entity data stores the received document entity data in a storage unit. The image processing apparatus transmits document property information to the document management server and requests the document management server to perform document registration. The image processing apparatus sends, to the document management server, an inquiry about accessibility to the stored document entity data, if the document entity data is requested by the client apparatus, based on information obtained from the client apparatus. The image processing apparatus controls transmission of the requested document entity data to the client apparatus based on an obtained inquiry result received from the document management server.

8 Claims, 16 Drawing Sheets

U.S. PATENT DOCUMENTS

| | | | |
|---|---|---|---|
| 2004/0215871 A1* | 10/2004 | Yoshizawa et al. | 711/108 |
| 2004/0236862 A1* | 11/2004 | Ito et al. | 709/230 |
| 2005/0018055 A1* | 1/2005 | Cheng et al. | 348/231.2 |
| 2005/0128527 A1* | 6/2005 | Brawn et al. | 358/401 |
| 2005/0174601 A1* | 8/2005 | Sawada | 358/1.15 |
| 2005/0185225 A1* | 8/2005 | Brawn et al. | 358/401 |
| 2005/0216522 A1* | 9/2005 | Gomes et al. | 707/201 |
| 2005/0243364 A1* | 11/2005 | Sakai | 358/1.15 |
| 2006/0012835 A1* | 1/2006 | Shimizu | 358/449 |
| 2007/0133051 A1* | 6/2007 | Hyakutake et al. | 358/1.15 |
| 2007/0150534 A1* | 6/2007 | Hyakutake et al. | 709/200 |

OTHER PUBLICATIONS

Ricoh Introduces Advanced Aficio 3025/3030 Multifunctional Series for Higher Productivity and Enhanced Security PR Newswire. New York: Oct. 12, 2005. p. 1.*

* cited by examiner

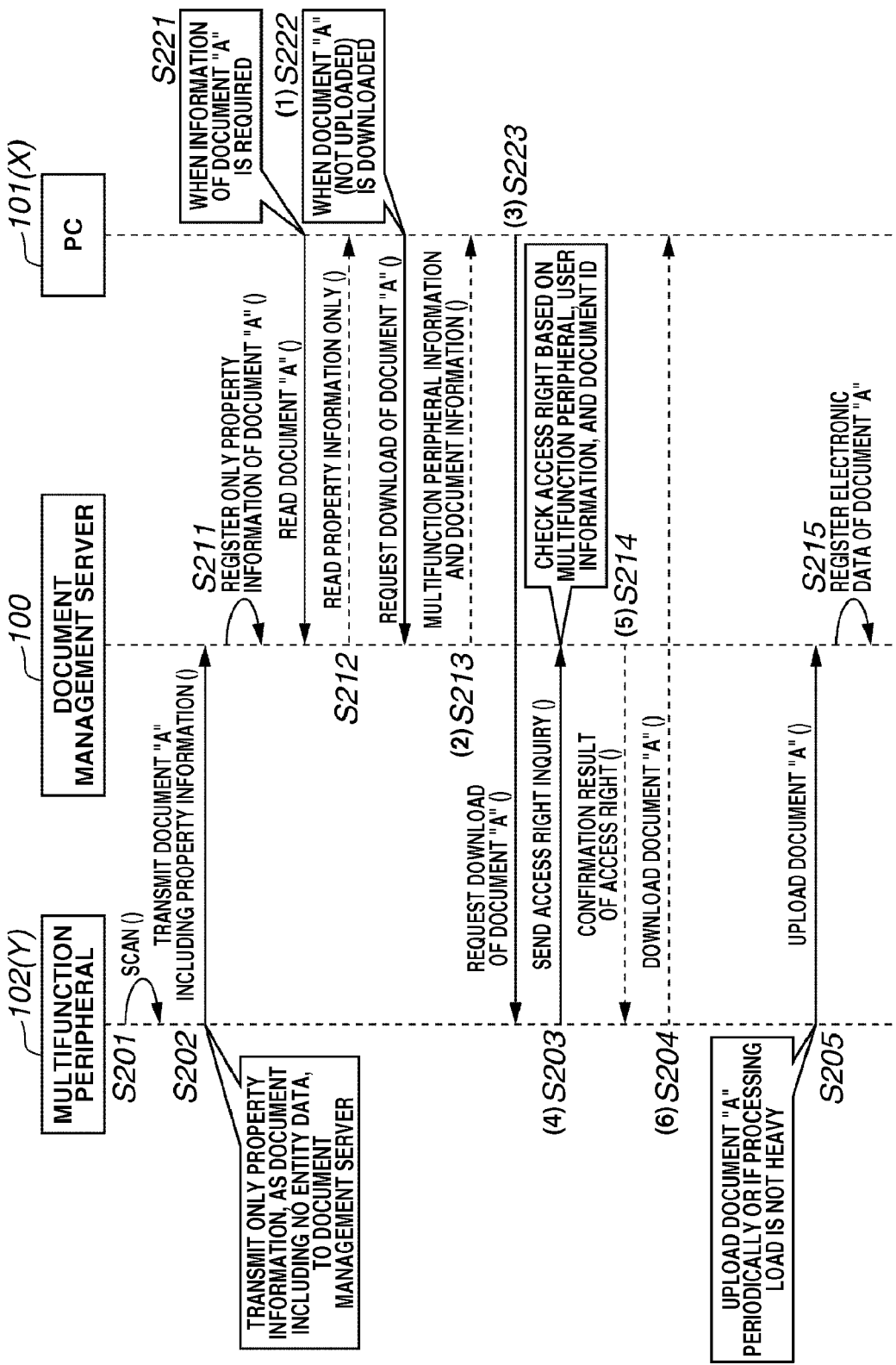

FIG.10

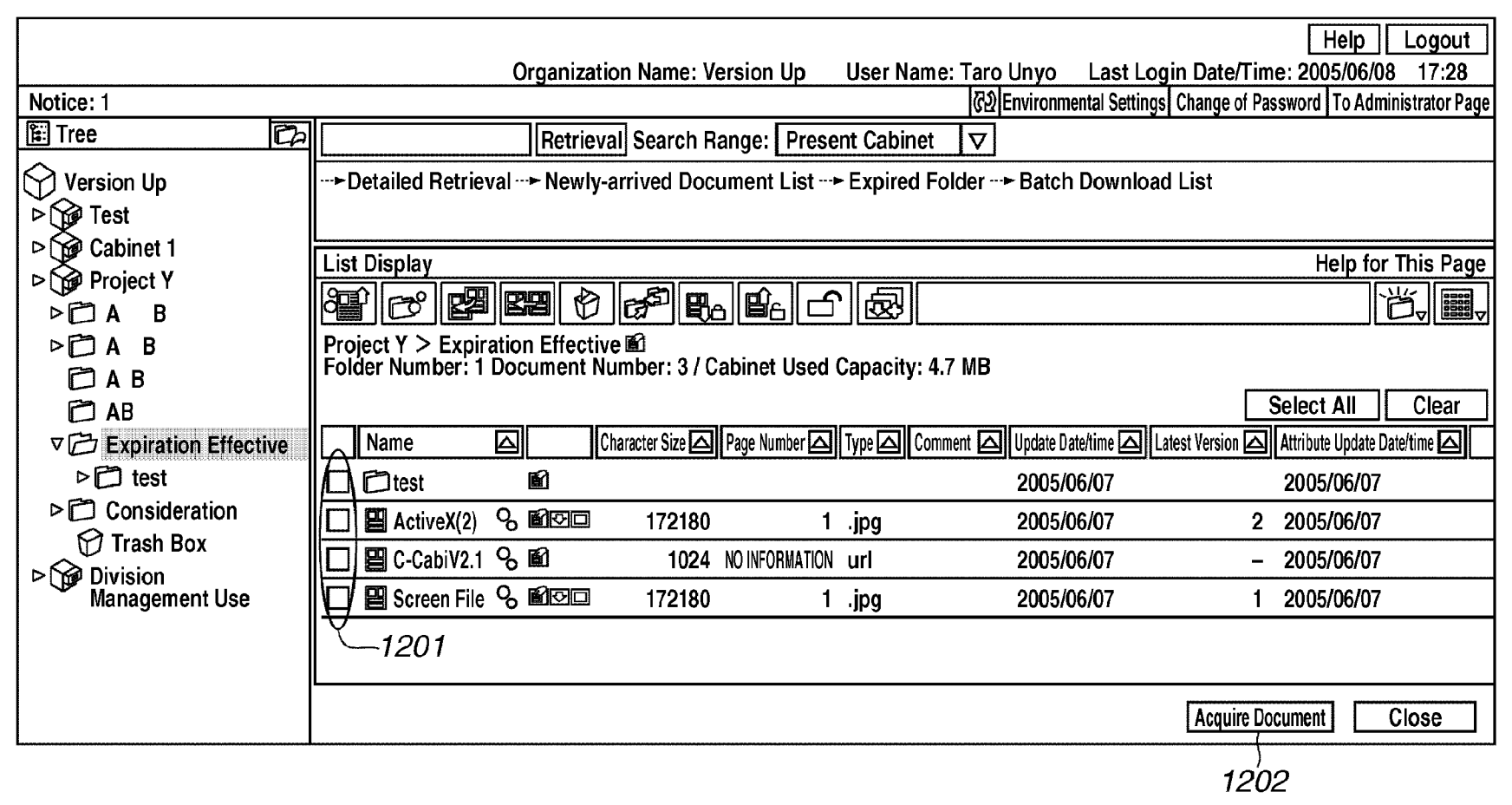

Notice: 1     Help | Logout

Organization Name: Version Up    User Name: Taro Unyo    Last Login Date/Time: 2005/06/08 17:28

Environmental Settings | Change of Password | To Administrator Page

Retrieval | Search Range: Present Cabinet ▽

→Detailed Retrieval → Newly-arrived Document List → Expired Folder → Batch Download List List Display     Help for This Page Project Y > Expiration Effective
Folder Number: 1  Document Number: 3 / Cabinet Used Capacity: 4.7 MB Select All | Attribute Update Date/time | Clear

| Name | Character Size | Page Number | Type | Comment | Update Date/time | Latest Version | Attribute Update Date/time |
|---|---|---|---|---|---|---|---|
| test | | | | | 2005/06/07 | | 2005/06/07 |
| ActiveX(2) | 172180 | 1 | .jpg | | 2005/06/07 | 2 | 2005/06/07 |
| C-CabiV2.1 | | 1024 | NO INFORMATION | url | 2005/06/07 | - | 2005/06/07 |
| Screen File | 172180 | 1 | .jpg | | 2005/06/07 | 1 | 2005/06/07 |

*1201*

Acquire Document   Close

*1202*

Tree
- Version Up
  - Test
  - Cabinet 1
  - Project Y
    - A  B
    - A  B
    - AB
    - Expiration Effective
      - test
    - Consideration
  - Trash Box
  - Division Management Use

FIG. 11

Notice: 1　　　Organization Name: Version Up　　User Name: Taro Unyo　　Last Login Date/Time: 2005/06/08　17:28　　Help　Logout
　　　　　　　　　　　　　　　　　　　　　　　　　　　　　　　　　Environmental Settings | Change of Password | To Administrator Page Tree | Retrieval | Search Range: Present Cabinet ▽

→ Detailed Retrieval → Newly-arrived Document List → Expired Folder → Batch Download List

- Version Up
- Test
  - Cabinet 1
  - Project Y
    - A　B
    - A　B
    - AB
    - Expiration Effective
      - test
    - Consideration
    - Trash Box
  - Division Management Use Folder Information　　　　　　　　　　　　　　　　　　　Help for This Page Project Y > Expiration Effective
Folder Information Folder Information

| Folder Name: | test |
| Comment | |
| Creator: | Taro Unyo |
| Folder Administrator: | |
| Access Right: | User/Group | Access Right |
| | G: CabinetEverybody | Read |
| | U: Saburo Ippan (General User) | Read |
| | U: Shiro Ippan (General User) | Deletion |
| | U: Ziro Unyo (Administrator) | Deletion |
| Total Size of Folder and Document: | 1024 bytes |
| Present Folder Number: | 1 |
| Present Document Number: | 0 |
| URL: | http://pooh1.cse.caxxx.co.jp/cc/Vup/Item.do?i=DjlpypWMuDWNl82777 |
| Creation Date/Time: | June 7, 2005　19:14:46 |
| Expiration Date/Time: | Not Set |
| Attribute Update Date/Time: | June 7, 2005　19:14:46 |
| Update Date/Time: | June 7, 2005　19:14:46 |
| Access Date/Time: | June 7, 2005　19:14:46 |
| Security Information: | Required |

Close

1301 — Acquire Document　　Return to Head　Close

FIG.14

FD/CD-ROM OR OTHER STORAGE MEDIUM

| DIRECTORY INFORMATION |
|---|
| PROGRAM CODE CORRESPONDING TO FLOWCHART STEPS OF FIG. 6 |
| PROGRAM CODE CORRESPONDING TO FLOWCHART STEPS OF FIG. 9 |
| PROGRAM CODE CORRESPONDING TO FLOWCHART STEPS OF FIG. 13 |
| | ic
IMAGE PROCESSING APPARATUS, DOCUMENT MANAGEMENT SERVER, DOCUMENT MANAGEMENT SYSTEM, AND DOCUMENT MANAGEMENT CONTROL METHOD

BACKGROUND OF THE INVENTION

1. Field of the Invention

The present invention relates to document management and control in a document management system including an image processing apparatus configured to input a document, a document management server configured to register and manage a document, and a client apparatus configured to communicate with the document management system and the document management server.

More specifically, the present invention relates to document management and control for a document management system capable of managing an image file (i.e., electronic file) obtained by an image processing apparatus (multifunction peripheral, copy machine, scanner, etc) that can scan a paper document and input a scanned image document.

2. Description of the Related Art

The network techniques enable personal computers (PCs) connected via a network to form a document management system that can store and manage electronic files as commonly usable documents.

In general, a document management system can be provided in an office including plural PCs connected via a network so that users can commonly use electronic files. Each PC user can transmit an electronic file via a network to the document management system. The document management system registers a received electronic file as a document. The registered electronic files can be accessed from each PC connected to the network. Each PC user can retrieve (or delete) a document managed in the document management system.

The above-mentioned document management system can be accessed by plural users operating their PCs. To improve the security, satisfying the following conditions is necessary to prevent an arbitrary user to freely access a document registered in the document management system.

1. Access right to an arbitrary document can be set.
2. Access of each user to a document can be controlled with reference to access right settings.

A conventional document management system was installed as an application operable on the OS. Each user installed a document management application on a PC.

On the other hand, recent web techniques enable each user to operate a document management system via a web browser.

Copy machines, multifunction peripherals, and scanners are image processing apparatus (image reading apparatus) that can be connected to a network and scan a paper document to obtain an electronic file (containing image data). An electronic file obtained from an image processing apparatus can be transmitted, via the network, and registered as a document in a document management system.

In this manner, a document management system can link with not only PCs but also image processing apparatus (image reading apparatus). For example, as discussed in Japanese Patent Application Laid-open No. 2005-39411, access control can be employed to determine whether a paper document can be copied in an image reading apparatus that scans the document.

An advanced image processing apparatus includes a hard disk or comparable auxiliary storage device that can store scanned electronic files, and has a URL-send function for enabling a user to access via a web browser to an electronic file stored in the image processing apparatus.

FIG. 15 is an illustration of a conventional URL-send function for accessing an electronic file stored in the image processing apparatus.

However, according to the system shown in FIG. 15, an image processing apparatus itself determines accessibility to an electronic file stored in its storage unit. In short, an electronic file stored in the image processing apparatus is not linked to a document management system.

There may be an environment where an electronic file stored in an image processing apparatus can be managed by a document management system. In this case, address of an electronic file stored in the image processing apparatus can be registered beforehand in the document management server. If a client requests the document management server to inform the address of a requested document, the document management server notifies the client of the address of the requested document using a hypertext transfer protocol (HTTP) redirect function. The client can access the electronic file stored in the image processing apparatus with reference to address information (URL) indicating the storage place of the requested electronic file.

SUMMARY OF THE INVENTION

Exemplary embodiments of the present invention are directed to a technique for transmitting an electronic file obtained by an image processing apparatus to a document management server for document registration without deteriorating performance of the image processing apparatus even if the transmission processing and other job are simultaneously performed.

Furthermore, when an image processing apparatus stores and manages electronic files as documents managed by a document management server, the present invention provides a system capable of managing an electronic file based on access right effective in the document management server.

According to an aspect of the present invention, an image processing apparatus communicates with a document management server and a client apparatus via a communication medium (e.g., network). The image processing apparatus includes: an input unit configured to input document entity data and document property information for determining accessibility to the document entity data; a storage unit configured to store the entered document entity data; a first registration request unit configured to transmit document property information of stored document entity data to the document management server and requests the document management server to perform document registration; an inquiry unit configured to send, to the document management server, an inquiry about accessibility to the stored document entity data, if the document entity data is requested by the client apparatus, based on information obtained from the client apparatus; and a control unit configured to control transmission of the requested document entity data to the client apparatus based on an obtained inquiry result.

According to another aspect of the present invention, a document management server communicates with an image processing apparatus and a client apparatus via a communication medium. The document management server includes: a registration unit configured to respond to a document registration request including property information required for determining accessibility to document entity data stored in the image processing apparatus, and registers a document in a storage unit based on the property information and information relating to the image processing apparatus storing the document entity data; a first reply unit configured to receive a request from the client apparatus that requires document entity data corresponding to the registered property information and transmits information indicating a storage destination of the entity data to the client apparatus; and a second reply unit configured to receive, from the image processing apparatus, inquiry information about accessibility to the registered document entity data, and determines accessibility to the document entity data with reference to information for determining accessibility to the registered document based on the inquiry information, and transmits the determined accessibility to the image processing apparatus.

Yet another aspect of the present invention provides a document management system including the above-mentioned image processing apparatus and the above-mentioned document management server.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a sequence diagram illustrating an example of a control processing procedure according to an exemplary embodiment.

FIG. 10 is an illustration of an exemplary screen that displays a list of documents registered in the document management server.

FIG. 11 is an illustration of an exemplary screen that displays document property information registered in the document management server.

FIG. 14 is an illustration of a memory map of a storage medium (recording medium) storing various data processing programs readable and executable by devices (e.g., document management server, multifunction peripheral, and client terminal) forming a document management system according to an exemplary embodiment.

DETAILED DESCRIPTION OF THE EMBODIMENTS

Figure 1:
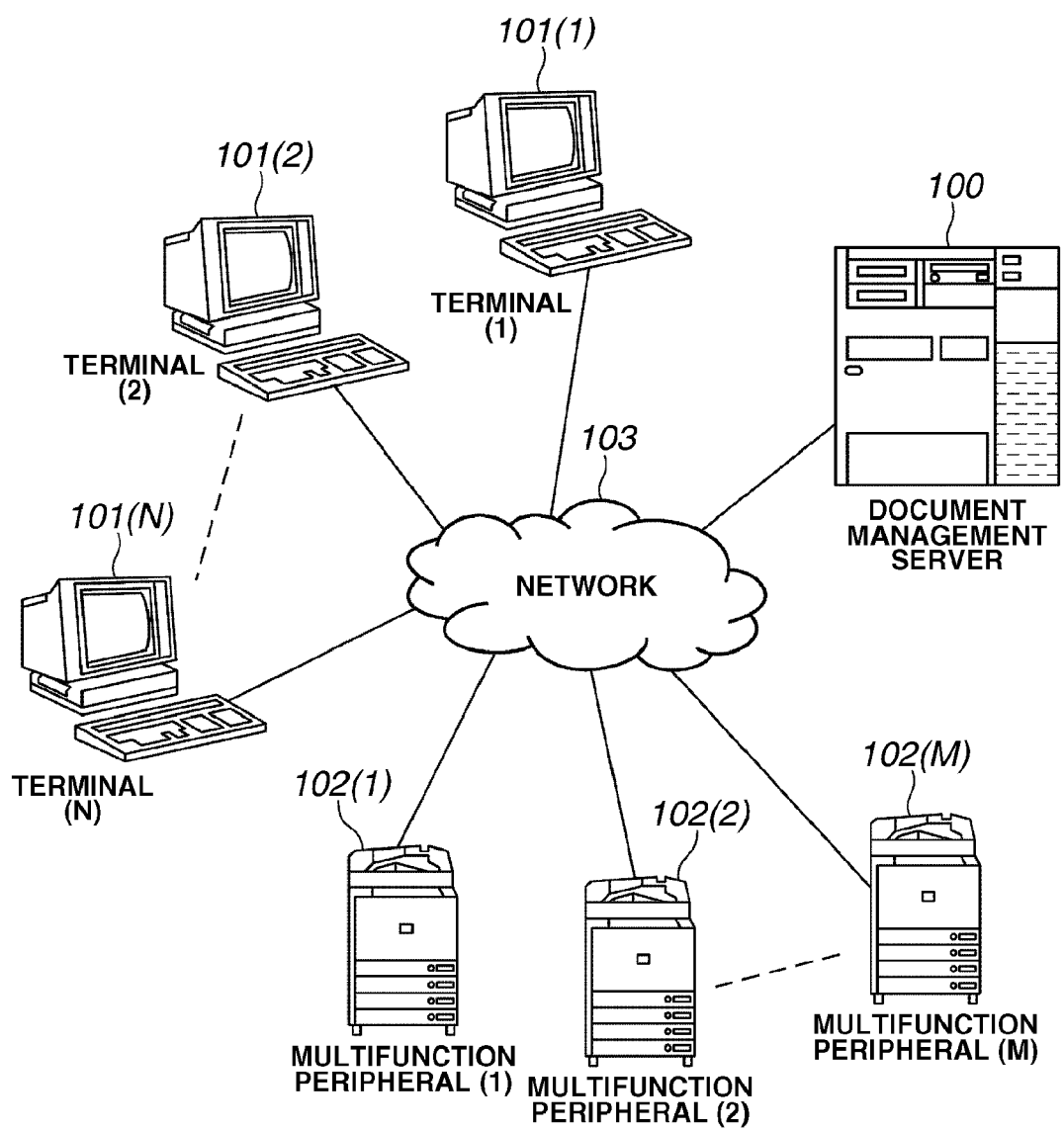
FIG. 1 is an illustration of an example of a document management system according to a first exemplary embodiment.

The following description of exemplary embodiments is merely illustrative in nature and is in no way intended to limit the invention, its application, or uses.

Processes, techniques, apparatus, and methods as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

Figure 16:
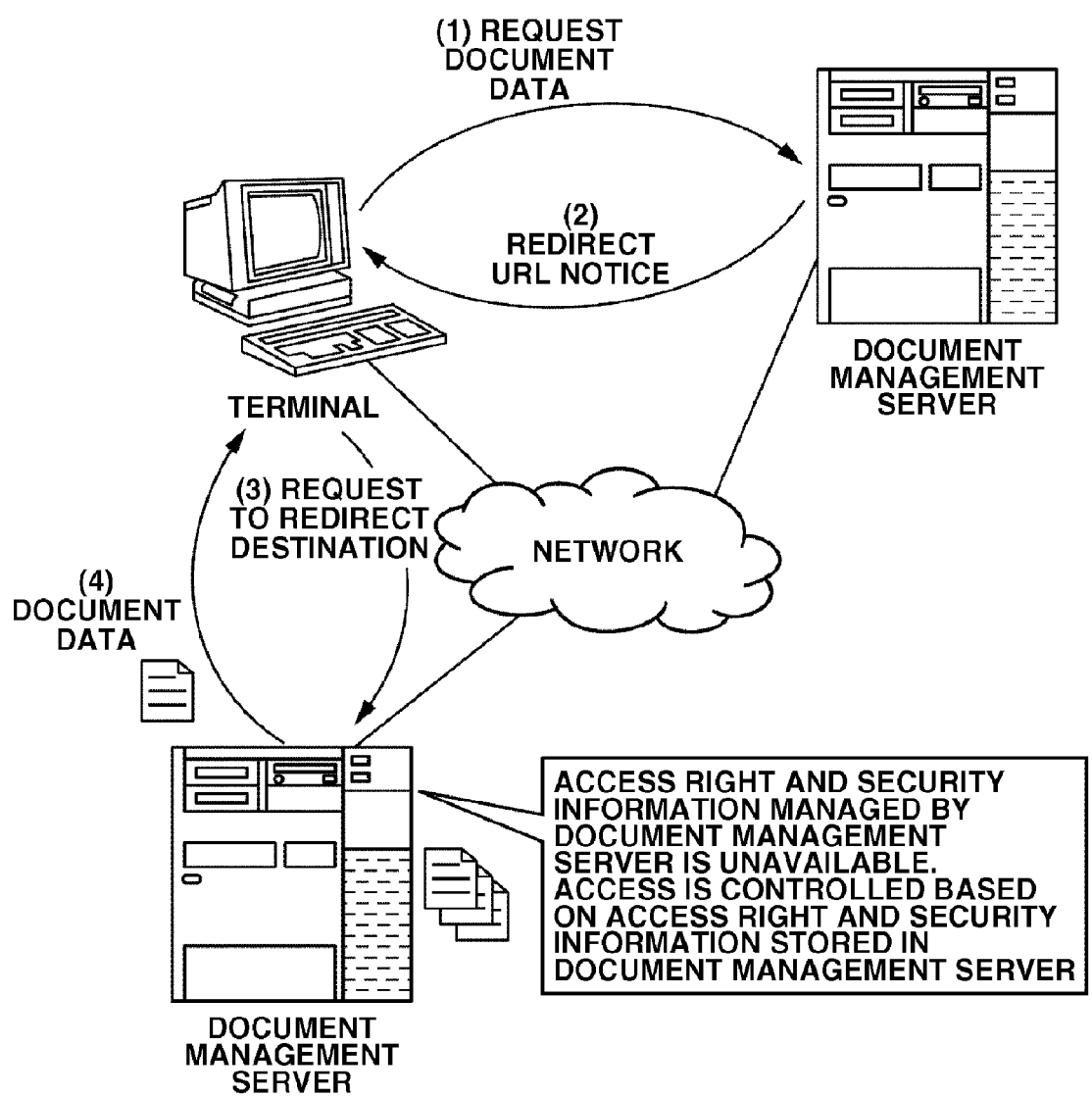
FIG. 16 is an illustration of a hypertext transfer protocol (HTTP) redirect function for acquiring an electronic file in an environment where an electronic file stored in an image processing apparatus can be managed in a document management system.

FIG. 16 is an illustration of a hypertext transfer protocol (HTTP) redirect function in an environment including a document management system that can manage an electronic file stored in an image processing apparatus.

In the system shown in FIG. 16, the following problem may arise when an electronic file obtained by an image processing apparatus is directly, via a network, transmitted to a document management system that registers the electronic file.

An image processing apparatus can include a central processing unit (CPU) and a memory to perform improved functions. However, the performance of CPU and a memory incorporated in an image processing apparatus may be insufficient compared to a personal computer (PC).

For example, when an electronic file obtained by an image processing apparatus is transmitted to a document management system, almost all of the processing ability of the image processing apparatus may be used for transmitting electronic file data to the document management system if the data size of the electronic file obtained by the image processing apparatus is large.

As a result, performance of an image processing apparatus may deteriorate if the image processing apparatus simultaneously execute the transmission processing and other job. In this case, a user may be forced to postpone the job.

In an environment where a document management system can manage an electronic file stored in an image processing apparatus, the following problems may arise.

The access right managed by the document management system is ineffective to control access to an electronic file stored in the image processing apparatus. More specifically, to obtain an electronic file stored in the image processing apparatus, a client PC can directly send a request to the image processing apparatus.

In other words, management of each electronic file stored in the image processing apparatus based on access right is only effective in the document management system. Therefore, when the client PC and the image processing apparatus directly transmit and receive an electronic file, the image processing apparatus cannot determine whether a user requesting the electronic file has access right.

The document management system allows many users to commonly use an electronic file. Thus, identifying a user currently possessing proper access right is difficult. The image processing apparatus itself cannot determine whether access to an electronic file stored in the image processing apparatus is acceptable.

In this manner, an electronic file stored in the image processing apparatus is not adequately linked to the document management system available by plural users.

First Exemplary Embodiment

FIG. 1 is an illustration of an example of a document management system according to a first exemplary embodiment. The document management system of the present exemplary embodiment includes a document management server that can exclusively register document property information as a document and an image processing apparatus, such as an image reading apparatus, which can manage an electronic file (i.e., entity of document).

The document management system of the present exemplary embodiment includes a document management server 100, plural client terminals 101(1), 101(2), . . . , and 101(N), and plural multifunction peripherals 102(1), 102(2), . . . , and 102(M) which are connected via a network 103. Each client terminal is a personal computer (PC). In the following description, client terminal 101(X) represents an arbitrary one of plural client terminals 101(1), 101(2), . . . , and 101(N), while multifunction peripheral 102(Y) represents an arbitrary one of plural multifunction peripherals 102(1), 102(2), . . . , and 102(M).

The multifunction peripheral 102(Y) can be used as an image processing apparatus, such as an image reading apparatus. The multifunction peripheral 102(Y) can be replaced with a scanner or other image processing apparatus. The network 103 can be Internet, intranet, or other network system.

In present exemplary embodiment, the devices in an intranet can communicate with each other according to the HTTP. More specifically, the document management system of the present exemplary embodiment enables each user of the client terminal 101(X) having a web browser to obtain a registered document list, display/read document properties, and download an electronic file (i.e., entity of a document).

Figure 2:
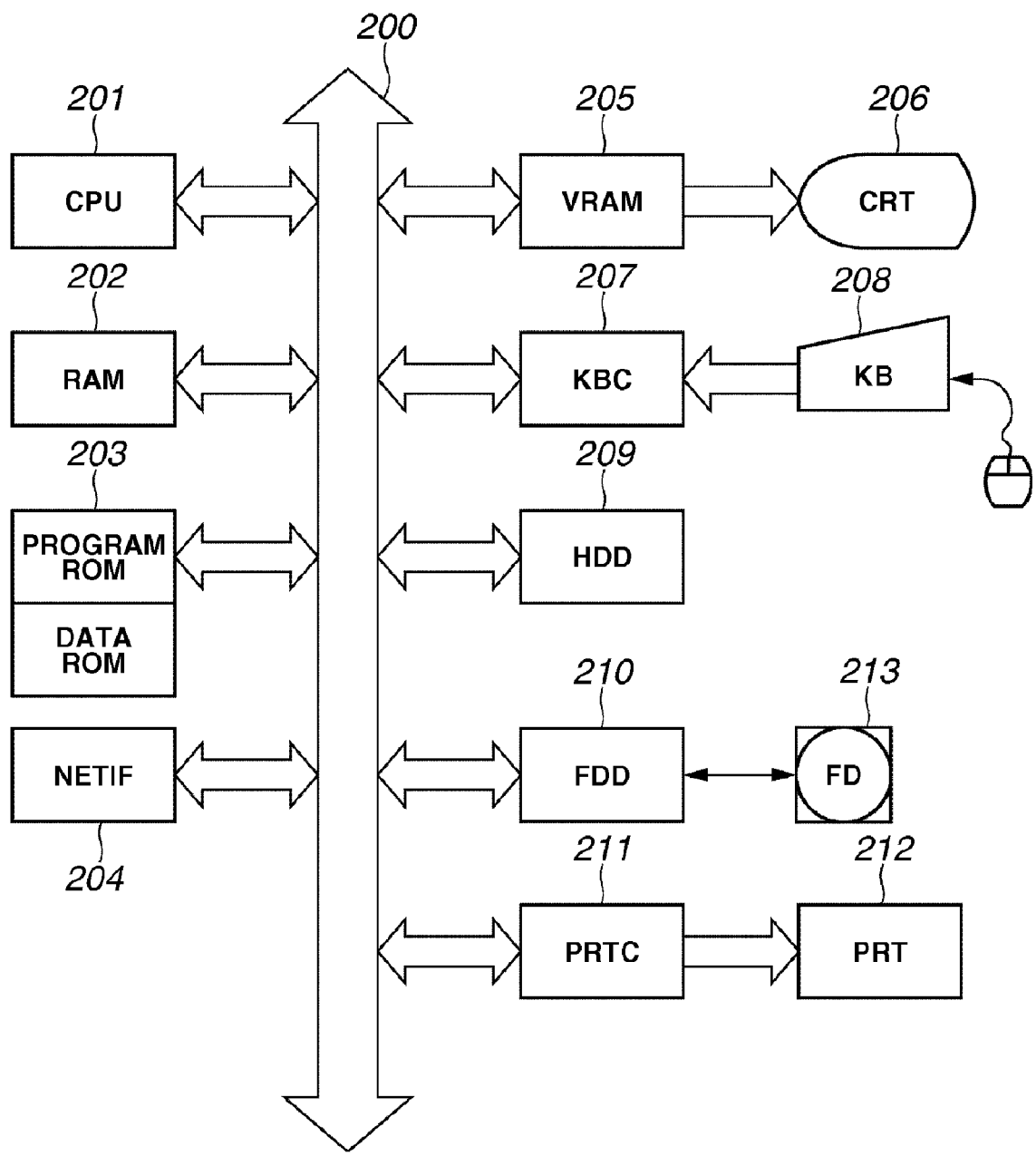
FIG. 2 is a block diagram illustrating an exemplary configuration of a document management server and a client terminal shown in FIG. 1.

FIG. 2 is a block diagram illustrating an exemplary configuration of the document management server 100 and the client terminal 101(X) shown in FIG. 1.

In FIG. 2, a central processing apparatus (hereinafter, referred to as CPU) 201 can execute calculations and controls of the information processing apparatus. A random access memory (hereinafter, referred to as RAM) 202 can function as a main memory of the CPU 201 and also function as an execution area and a data area of an execution program.

A read only memory (hereinafter, referred to as ROM) 203 stores action processing procedures of the CPU 201. The ROM 203 includes a program ROM storing basic software (OS) (i.e., system program) for executing a device control of the information processing apparatus and a data ROM storing information required in system operations. Each device can use a later-described hard disk drive (hereinafter, referred to as HDD) 209 instead of using the ROM 203.

A network interface (hereinafter, referred to as NETIF) 204 can control data transfer performed between information processing apparatuses via the network and can diagnose connection status. A video RAM (hereinafter, referred to as VRAM) 205 can rasterize images displayed on a screen of a display apparatus (hereinafter, referred to as CRT) 206 and can control the display of images.

CRT 206 is a cathode-ray tube or other comparable device that can display an operation state of the information processing apparatus. A controller (hereinafter, referred to as KBC) 207 can control an input signal entered from an external input apparatus (hereinafter, referred to as KB) 208. KB 208 is, for example, a pointing device such as a keyboard or a mouse that enables a user to input instructions and operation data.

A hard disk drive (hereinafter, referred to as HDD) 209 stores application programs and various data. The application programs of the present exemplary embodiment include software programs for realizing various processing of the present exemplary embodiment.

An external input/output apparatus (hereinafter, referred to as FDD) 210 is, for example, a floppy disk drive, a CD-ROM drive or other device capable of inputting/outputting data into/from a removable disk. FDD 210 may be used to read the above-mentioned application program from a recording medium (hereinafter, referred to as FD) 213.

FD 213 is detachably inserted into the FDD 210 and read by the FDD 210. The recording medium of the present exemplary embodiment includes a magnetic recording medium (e.g., a floppy disk or an external hard disk), an optical recording medium (e.g., CD-ROM), a magneto-optical recording medium (e.g., MO), a semiconductor recording medium (e.g., a memory card), or other data recording device (e.g., a removable medium). The application program and data stored in the HDD 209 can be stored in the FD 213.

A controller (hereinafter, referred to as PRTC) 211 can control an output signal sent to a print apparatus (hereinafter, referred to as PRT) 212. PRTC 212 is, for example, a laser beam printer. A data transmission bus (e.g., an address bus, a data bus, an input/output bus, and a control bus) 200 connects the above-mentioned functional units or devices.

Figure 3:
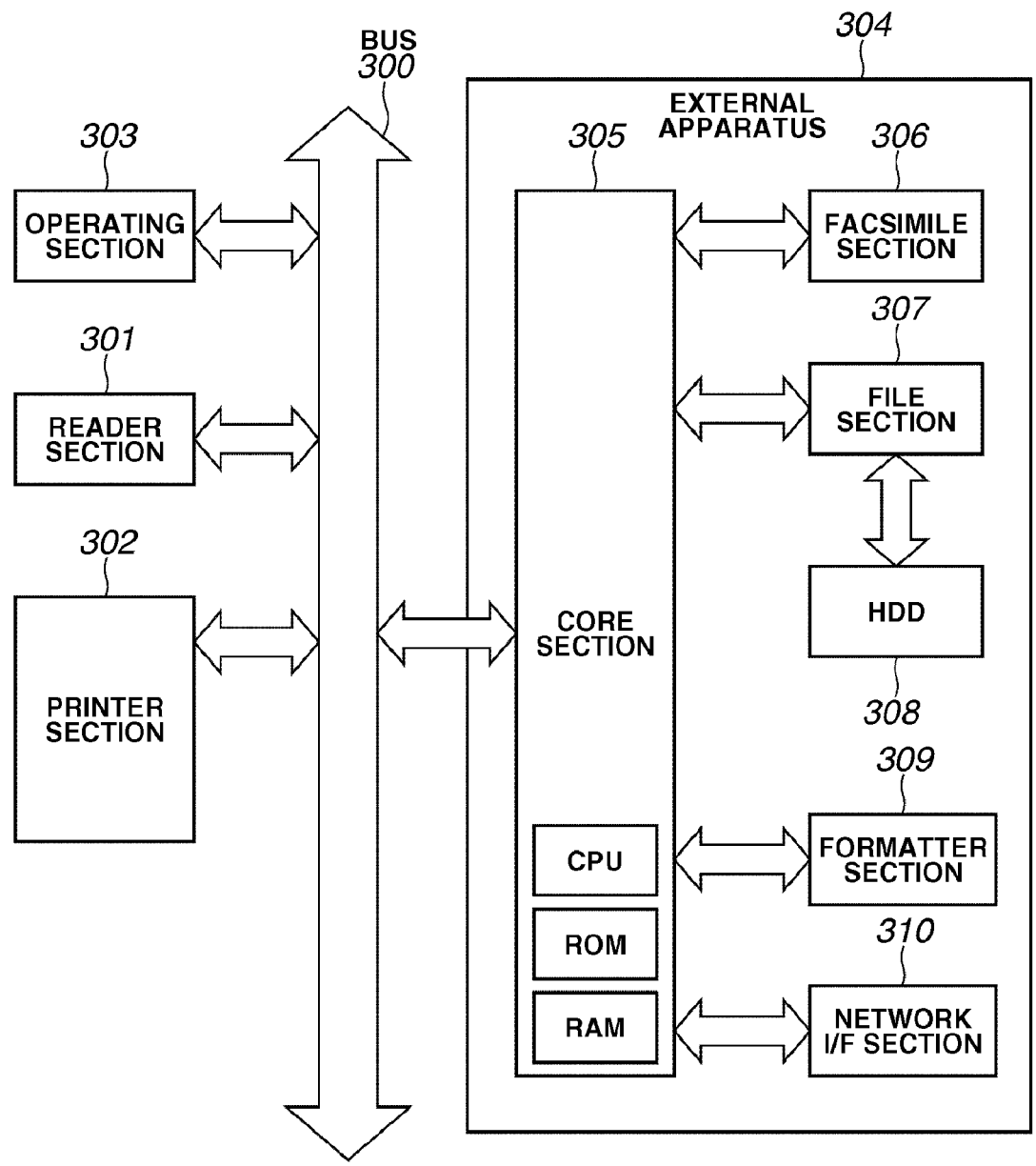
FIG. 3 is a block diagram illustrating an exemplary configuration of a multifunction peripheral shown in FIG. 1.

FIG. 3 is a block diagram illustrating an exemplary configuration of the multifunction peripheral 102(Y) shown in FIG. 1.

In FIG. 3, an image input apparatus (hereinafter, referred to as "reader section") 301 equipped with a CCD linear image sensor is capable of photoelectrically reading a scanned document image. The reader section 301 can convert the scanned document image into digital image data.

An image output apparatus (hereinafter, referred to as "printer") 302 is equipped with plural types of recording paper cassettes. The printer 302 can print, on a recording paper, a visible image based on image data obtained from the reader section 301 in response to a print instruction supplied from the reader section 301.

An operating section 303 enables a user to input a print instruction to the reader section 301 and instructs various processing to an external apparatus 304 electrically connected to the reader section 301. The external apparatus 304 includes a core section 305, a facsimile section 306, a file section 307, an external storage device 308, a formatter section 309, and a network interface section (network I/F section) 310.

The core section 305 can perform state management, command input/output control, and image data input/output control for the facsimile section 306, the file section 307, the external storage device 308, the formatter section 309, and the network I/F section 310. The core section 305 includes CPU, ROM, and RAM. The CPU in the core section 305 can load the program stored in the ROM (or HDD) into the RAM and can execute the program to realize various controls.

The facsimile section 306 can perform facsimile transmission/reception via a public telephone network (not shown). The file section 307 can manage data stored in the external storage device 308 connected to the file section 307. The formatter section 309 can expand the image data information into a visible image. The network I/F section 310 can control a connection to the network 103.

A data transmission bus (e.g., an address bus, a data bus, an input/output bus, and a control bus) 300 connects the reader section 301, the printer section 302, the operating section 303, and the external apparatus 304.

Figure 4:
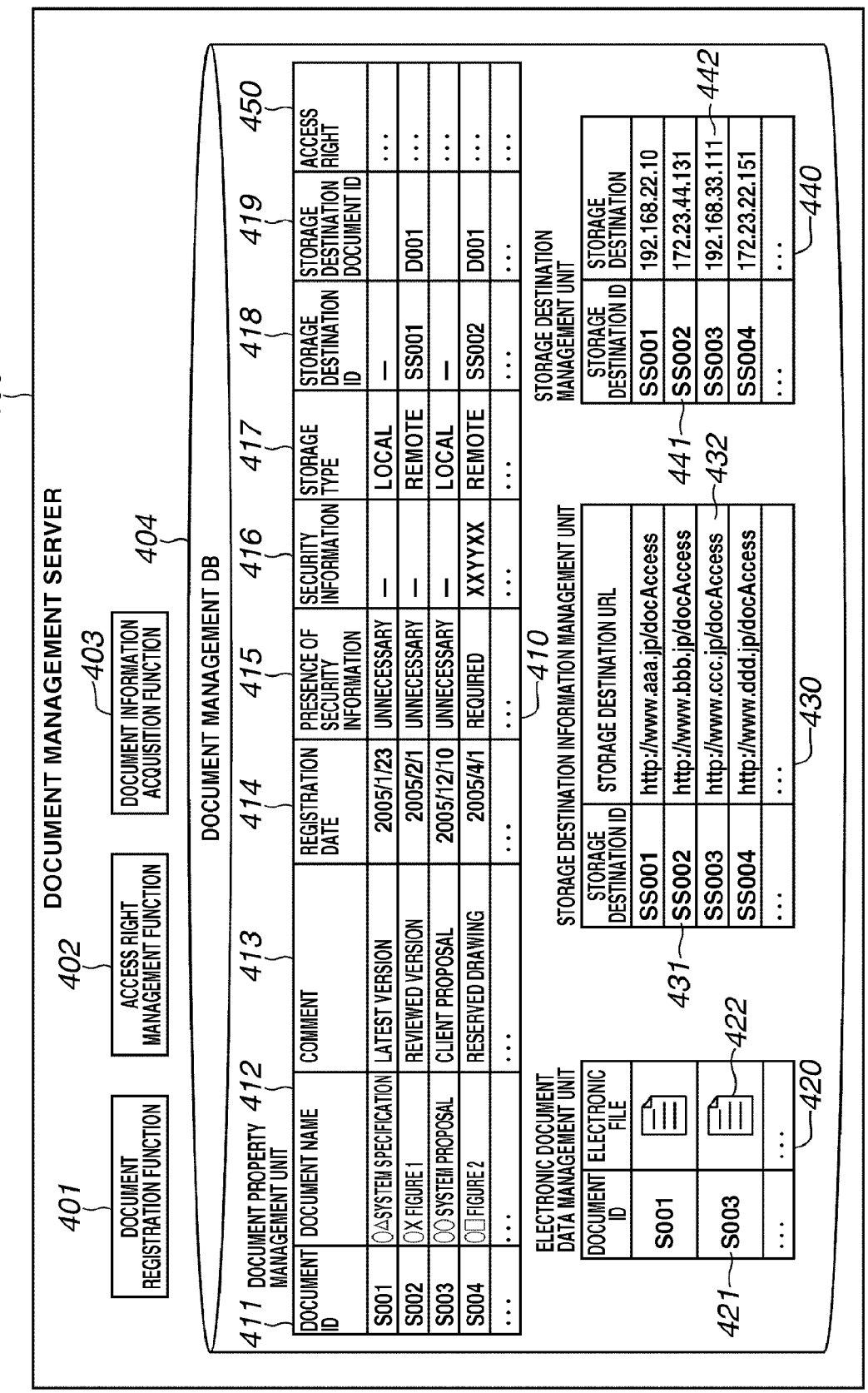
FIG. 4 is an illustration of a function group and an information storage unit group that can realize processing performed in the document management server of FIG. 1.

FIG. 4 is an illustration of a function group and an information storage unit group that can realize processing performed in the document management server 100 shown in FIG. 1.

The document management server 100 has document management functions including registration, storage, and retrieval of documents.

More specifically, the document management server 100 includes a document registration function 401 that can register documents. The document registration function 401 can receive a document registration request from the client terminal 101(X) and register document property information into a document property management unit 410 according to the contents of the received document registration request. Furthermore, the document registration function 401 can register an electronic file, transmitted together with the document registration request, into an electronic document data management unit 420.

The document registration function 401 can receive a document registration request from the multifunction peripheral 102(Y). In response to a document registration request received from the multifunction peripheral 102(Y), the document registration function 401 registers document property information into the document property management unit 410 according to the contents of the received document registration request.

If the multifunction peripheral 102(Y) transmits an electronic file together with a document registration request, the document registration function 401 can register the electronic file into the electronic document data management unit 420 similar to the document registration request from the client terminal 101(X). If no electronic file is attached to a document registration request sent from the multifunction peripheral 102(Y), the document registration function 401 can register a storage destination of an electronic file into a storage destination information management unit 430 based on the information relating to the multifunction peripheral 102(Y) that has transmitted the document registration request.

To realize the document registration function 401, the CPU in the document management server 100 executes a program loaded from the HDD into the RAM.

An access right management function 402 manages settings relating to the access right of each user (e.g., whether or not a user can read, change, and delete) with respect to a document stored and managed in the document management server 100). The access management function 402 can reply to an inquiry if sent from a document information acquisition function 403 or from the multifunction peripheral 102(Y). To realize the access management function 400, the CPU in the document management server 100 executes a program loaded from the HDD into the RAM.

The document information acquisition function 403 receives a document list request from the client terminal 101(X), and transmits a list of accessible documents to the client terminal 101(X) with reference to the access right of a user. To realize the document information acquisition function 403, the CPU in the document management server 100 executes a program loaded from the HDD to the RAM.

The HDD of the document management server 100 can realize document management DB 404. The document management DB 404 includes document property management unit 410 that provides a management table of document property information registered in the document management server 100.

Document ID 411 is allocated to each document managed in the document management server 100. Document name 412 indicates the name of each document. In the registration of a document, a user can arbitrarily input comment 413 as document property information.

Document registration date 414 indicates registration date of each document. Flag 415 indicates the presence of security information 416. The document management server 100 of the present exemplary embodiment can manage password information in addition to the access right. When a user accesses a registered document, the user is required to input a password. The password information is security information.

Storage type 417 indicates the type of a storage place of an electronic file (i.e., entity of document). The storage type 417 includes two types, i.e., "LOCAL" indicating a document managed in the document management server 100 and "REMOTE" indicating a document managed in the multifunction peripheral 102(Y).

Storage destination ID 418 indicates a storage destination of a document when the storage type 417 is "REMOTE." The storage destination ID 418 can discriminate each storage destination in the document management system and can be managed by a storage destination management unit 440.

Storage destination document ID 419 is a document ID of a document managed in a storage place (e.g., multifunction peripheral 102(Y)) designated by the storage destination ID 418.

Access right 450 stores setting information relating to the access right (e.g., reading, overwrite, and deletion) of a user or a user group.

The electronic document data management unit 420 can manage an electronic file (i.e., entity of a document) 422. The electronic document data management unit 420 includes document ID 421 that is identical to the document ID 411 of the document property management unit 410. The document ID 421 and the document ID 411 can correlate electronic data in the electronic document data management unit 420 with property information in the document property management unit 410.

The storage destination information management unit 430 provides an inquiry destination management table required for obtaining an electronic file (i.e., entity of a document) applied to documents having the storage type 417 managed by "REMOTE." The storage destination information management unit 430 includes storage destination ID 431 that is identical to the storage destination ID 418 of the document property management unit 410.

The storage destination ID 431 and the storage destination ID 418 can correlate the inquiry destination managed by the storage destination information management unit 430 with the document property information managed by the document property management unit 410. Storage destination URL 432 indicates an inquiry destination required to obtain an electronic file (i.e., entity of a document).

The storage destination management unit 440 provides a management table of information relating to a storage destination in the document management system. The storage destination management unit 440 includes storage destination ID 441 that is identical to the storage destination ID 431 of the storage destination information management unit 430.

The storage destination ID 441 and the storage destination ID 431 can correlate the storage destination managed by the storage destination management unit 440 with the inquiry destination managed by the storage destination information management unit 430. Storage destination address 442 indicates a storage destination.

Figure 5:
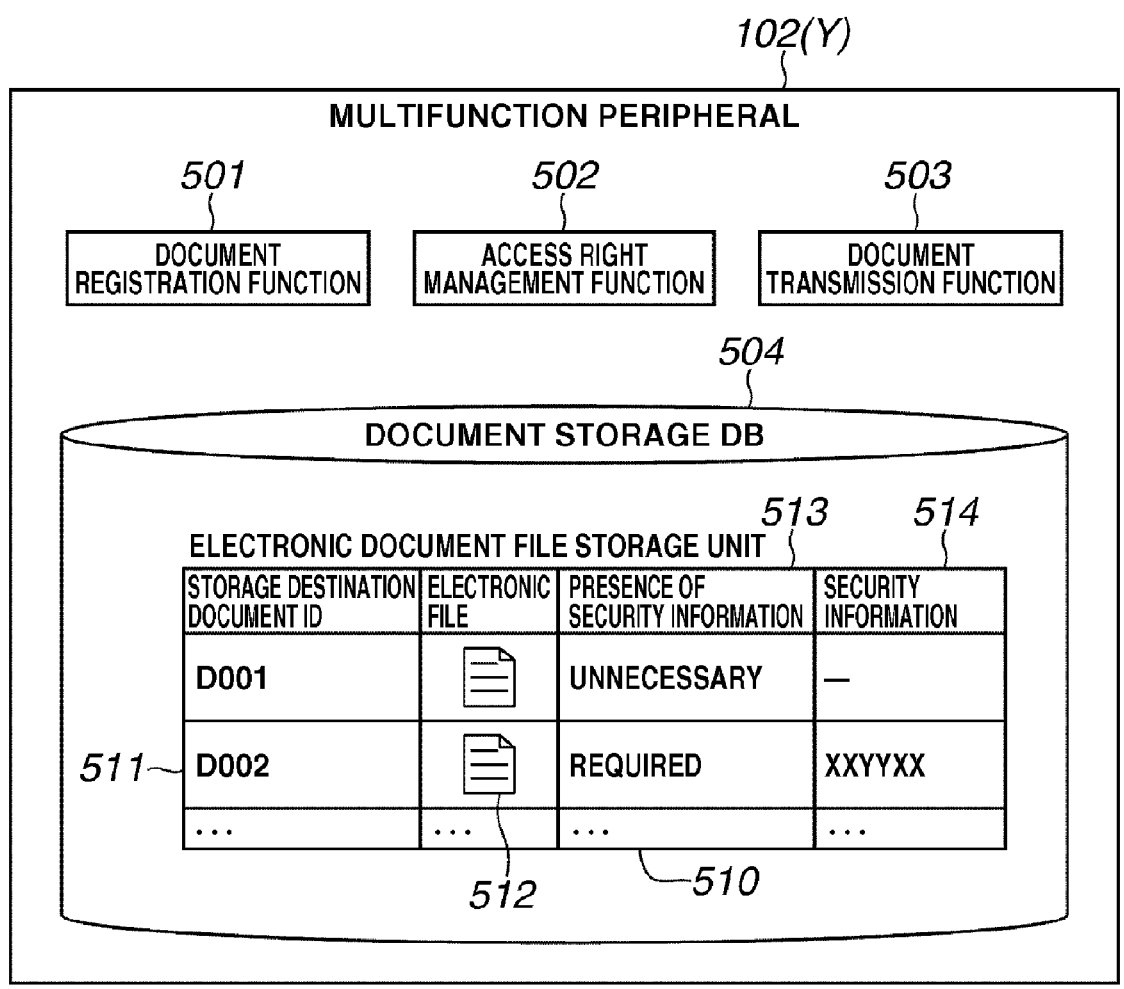
FIG. 5 is an illustration of a function group and an information storage unit group that can realize processing performed in the multifunction peripheral that can function as an image processing apparatus (e.g., image reading apparatus) of FIG. 1.

FIG. 5 is an illustration of a function group and an information storage unit group that can realize processing performed in the multifunction peripheral 102(Y) that can function as an image processing apparatus (e.g., image reading apparatus) shown in FIG. 1.

In FIG. 5, the multifunction peripheral 102(Y) can scan a paper document, copy scanned image data, and store the image data as an electronic file.

The multifunction peripheral 102(Y) includes a document registration function 501 for storing, in the multifunction peripheral 102(Y), a document file including image data obtained by scanning a paper document. To realize the document registration function 501, the CPU in the core section 305 of the multifunction peripheral 102(Y) executes a program loaded from the ROM into the RAM.

The multifunction peripheral 102(Y) includes an access right inquiry function 502 for inquiring the document management server 100 about accessibility of a designated document in accordance with a request sent from a document transmission function 503. To realize the access right inquiry function 502, the CPU in the core section 305 of the multifunction peripheral 102(Y) executes a program loaded from the ROM into the RAM.

The document transmission function 503 requests the access right inquiry function 502 to confirm about accessibility to a document according to a request of the client terminal 101(X).

The document transmission function 503, if a document is accessible, extracts an electronic file including the document from an electronic document file storage unit 510 and transmits the electronic file to the client terminal 101(X). To realize the document transmission function 503, the CPU in the core section 305 of the multifunction peripheral 102(Y) executes a program loaded from the ROM into the RAM.

The multifunction peripheral 102(Y) includes a document storage DB 504 that stores entity data of a document file (i.e., image data obtained by scanning). HDD 308 of the multifunction peripheral 102(Y) can realize the document storage DB 504.

The electronic document file storage unit 510 stores scanned image data. Storage destination document ID 511 is allocated to each document file stored in the multifunction peripheral 102(Y) so that each document file can be managed in the multifunction peripheral 102(Y).

Electronic file 512 is entity data of a document file. Flag 513 indicates whether security information 514 is added during a scanning operation.

Figure 6:
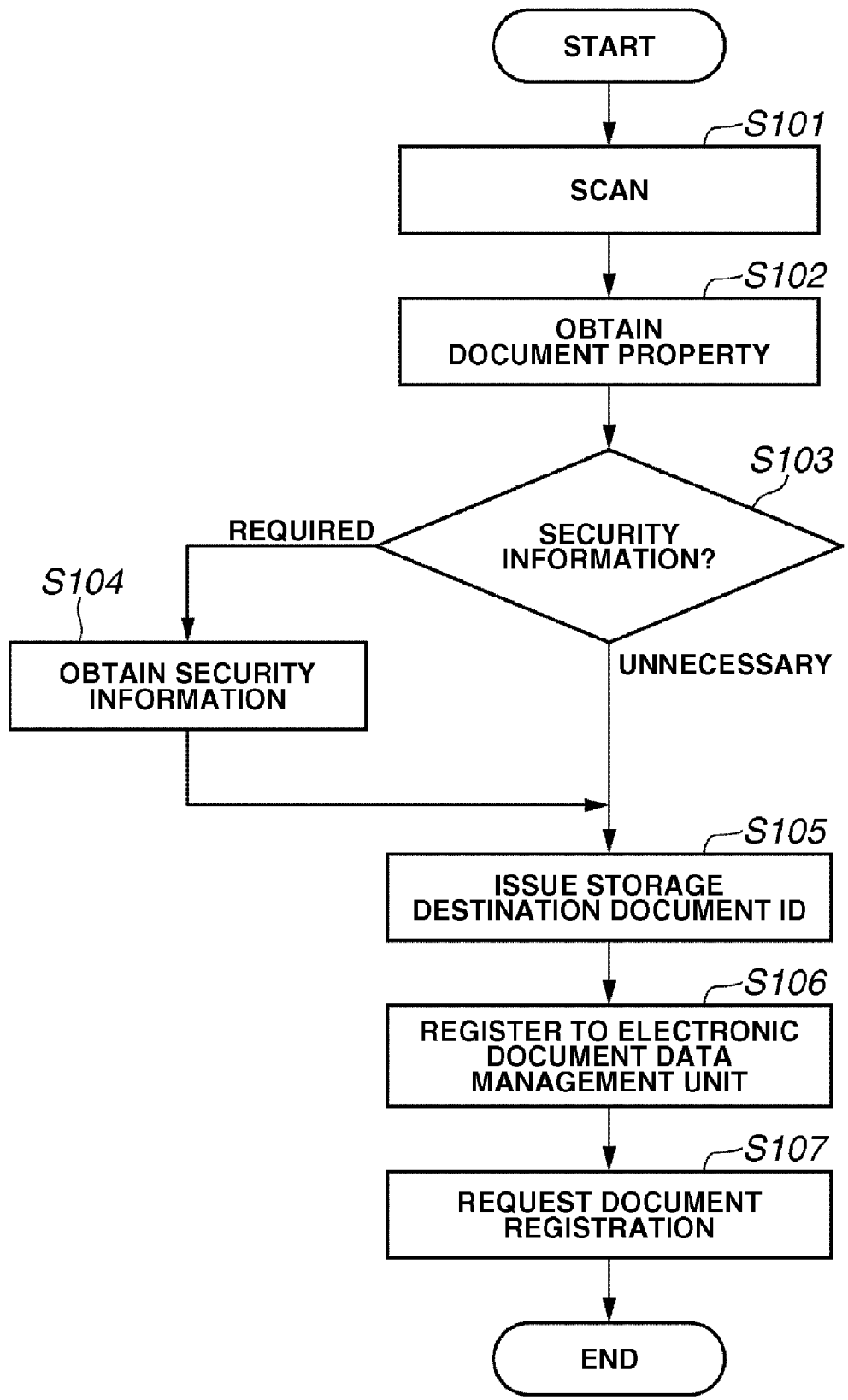
FIG. 6 is a flowchart illustrating an example of a control processing procedure according to an exemplary embodiment.
Figure 7:
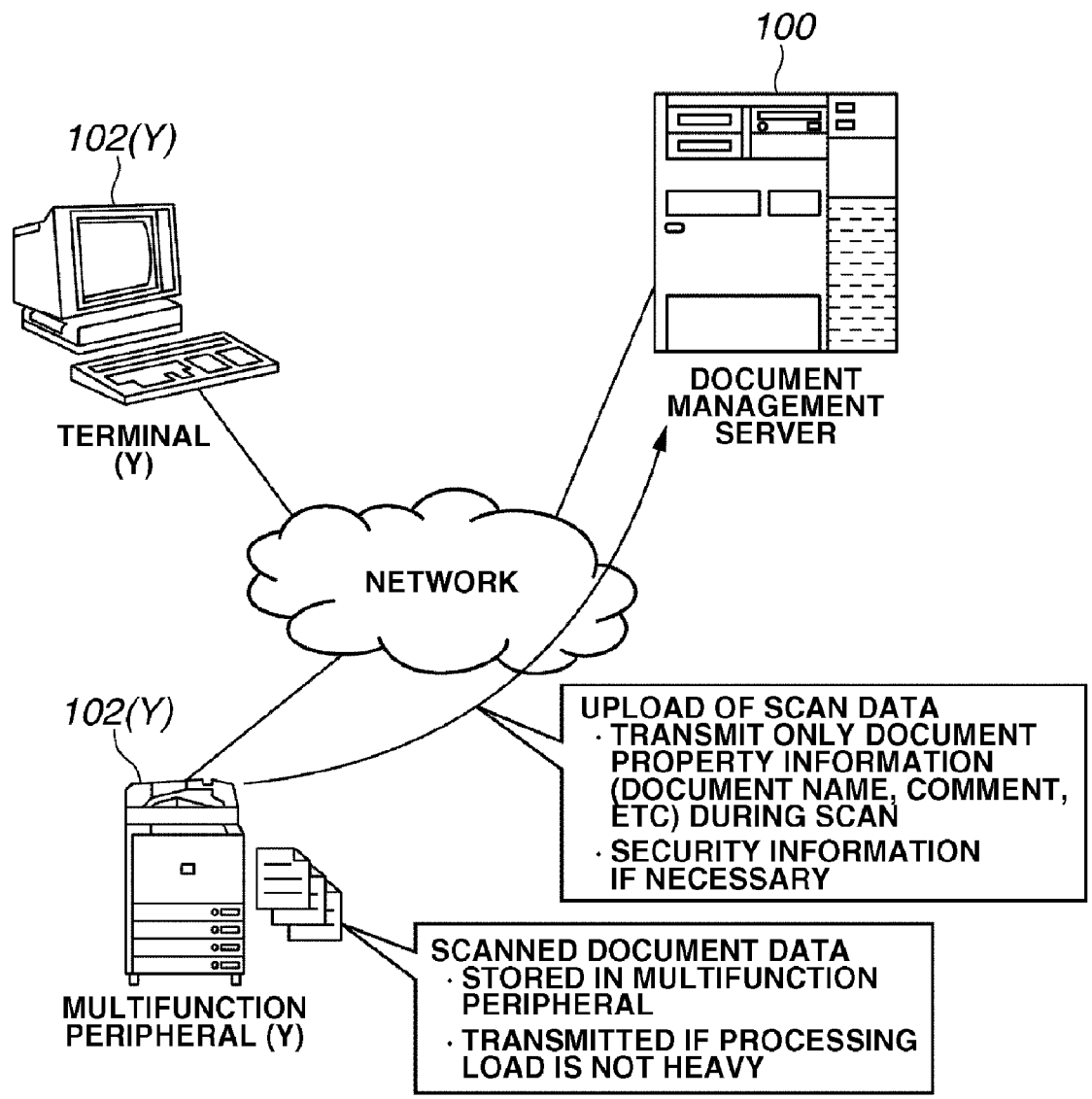
FIG. 7 is a conceptual diagram illustrating document registration processing for registering a paper document scanned by the multifunction peripheral (i.e., image processing apparatus) to the document management server.

FIGS. 6 and 7 illustrate processing of the multifunction peripheral 102(Y) that scans a paper document, stores in the electronic document file storage unit 510 an electronic file including scanned document image, and manages the stored electronic file, while the document management server 100 resisters the document.

FIG. 6 is a flowchart illustrating an example of a control processing procedure according to an exemplary embodiment. The processing of the flowchart corresponds to the processing of the multifunction peripheral 102(Y) that scans a paper document and stores in the electronic document file storage unit 510 an electronic file including scanned document image and manage the stored electronic file, while the document management server 100 registers the document. To realize the processing of FIG. 6, the CPU in the core section 305 of the multifunction peripheral 102(Y) executes a program loaded from the ROM into the RAM.

Before starting the processing of FIG. 6, a user inputs document property information (e.g., document name, comment, etc) through the operating section 303 of the multifunction peripheral 102(Y). Furthermore, the user inputs security information including access right and settings relating to password information required to access if it is required. The RAM in the core section 305 stores the input information.

A user sets a paper document to be registered on the reader section 301 of the multifunction peripheral 102(Y) and instructs scanning of the paper document through the operating section 303. In step S101, the core section 305 of the multifunction peripheral 102(Y) executes scan processing and the reader section 301 obtains an electronic file including digital electronic data representing the scanned paper document.

Next, in step S102, the core section 305 of the multifunction peripheral 102(Y) obtains document property information entered by a user beforehand.

Next, in step S103, the core section 305 of the multifunction peripheral 102(Y) determines whether there is any security information entered by a user beforehand. If the security information is present ("REQUIRED" in step S103), the core section 305 of the multifunction peripheral 102(Y) obtains the security information in step S104. Then, the processing flow proceeds to step S105.

If no security information is present ("UNNECESSARY" in step S103), the processing flow proceeds to step S105.

In step S105, the core section 305 of the multifunction peripheral 102(Y) inputs the electronic file obtained in step S101 and the security information obtained in step S104 into the document registration function 501 of the multifunction peripheral 102(Y). The document registration function 501 issues a storage destination document ID in response to reception of the electronic file and the security information.

Furthermore, in step S106, the document registration function 501 registers the storage destination document ID 511, electronic file 512, presence of security information 513, and security information 514 in the electronic document file storage unit 510. An electronic file registered as a single document can be plural files. For example, plural electronic files if obtained depending on resolution of scanning can be registered together.

After the electronic file and the security information are registered in the electronic document file storage unit 510, the core section 305 of the multifunction peripheral 102(Y) requests the document management server 100 to execute document registration in step S107 and terminates the processing of this routine. The electronic file can be transmitted to the document management server 100 when a processing load of the multifunction peripheral 102(Y) is not heavy. Details of the document registration request transmitted from the multifunction peripheral 102(Y) to the document management server 100 will be described later.

As described above, the multifunction peripheral 102(Y) stores an electronic file including scanned document image data in its storage and requests the document management server 100 to register document property information corresponding to the electronic file.

FIG. 7 is a conceptual diagram illustrating document registration processing for registering a paper document scanned by the multifunction peripheral (i.e., image processing apparatus) 102(Y) to the document management server 100.

In FIG. 7, the multifunction peripheral 102(Y) stores a scanned electronic file into the electronic document file storage unit 510. Then, the multifunction peripheral 102(Y) transmits a document registration request to the document management server 100 (refer to step S107 of FIG. 6).

The document registration request includes storage destination document ID 511 issued by the multifunction peripheral 102(Y) and the document property information, access right information, and security information entered by a user through operating section 303 of the multifunction peripheral 102(Y).

The CPU of the document management server 100 receives a document registration request from the multifunction peripheral 102(Y). The document registration function 401 issues a document ID. The document property management unit 410 registers the received document property information, access right information, security information, and storage destination document ID. The registration processing corresponds to the processing of step S211 in FIG. 9.

In this case, the CPU of the document management server 100 registers "REMOTE" in the storage type 417 of the document property management unit 410. Furthermore, the CPU of the document management server 100 obtains a storage destination ID from address information of a transmission source involved in the document registration request with reference to the information in the storage destination management unit 440, and registers the obtained storage destination ID into the storage destination ID 418.

As described above, in response to a document registration request sent from the multifunction peripheral 102(Y), the document management server 100 registers a document without an electronic file (i.e., entity of a document).

At specific timing, the multifunction peripheral 102(Y) can transmit, to the document management server 100, an electronic file (i.e., entity of registered property information) stored in the electronic document file storage unit 510 and request the document management server 100 to register the entity of document.

The specific timing is, for example, predetermined date/time (e.g., 2 AM) designated by a user through the operating section 303, or timing the multifunction peripheral 102(Y) shifts into a power saving state (sleep mode), or timing a power source of the multifunction peripheral 102(Y) is turned off.

FIGS. 8 through 11 illustrate detailed processing for obtaining an electronic file stored and managed in the multifunction peripheral (i.e., image processing apparatus) 102(Y) via the document management server 100.

Figure 8:
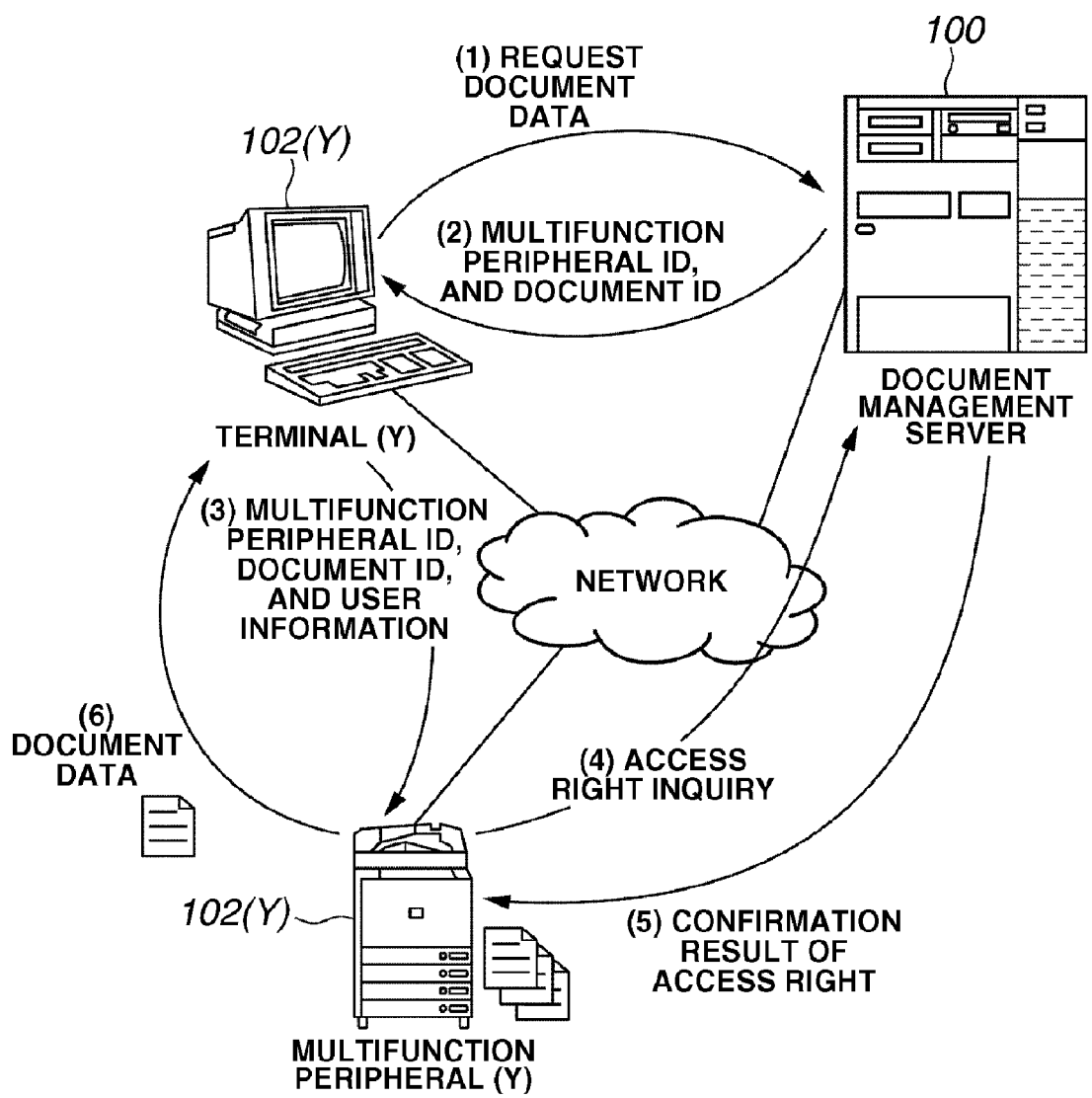
FIG. 8 is a conceptual diagram illustrating the processing for obtaining an electronic file stored and managed in the multifunction peripheral (i.e., image processing apparatus) via the document management server.

FIG. 8 is a conceptual diagram illustrating the processing for obtaining via the document management server 100 an electronic file stored and managed in the multifunction peripheral (i.e., image processing apparatus) 102(Y).

FIG. 9 is a sequence diagram illustrating an example of a control processing procedure according to an exemplary embodiment, corresponding to the processing for obtaining via the document management server 100 an electronic file stored and managed in the multifunction peripheral (i.e., image processing apparatus) 102(Y).

The multifunction peripheral 102(Y) executes the processing of steps S201 through S205. The CPU of the core section 305 reads a program from the ROM and executes the program to realize the processing of steps S201 through S205. The document management server 100 executes the processing of steps S211 through S216. The CPU of the document management server 100 executes a program loaded from the HDD to the RAM to realize the processing of steps S211 through S216. Furthermore, the client terminal 101(X) executes the processing of steps S221 through S223. The CPU of the client terminal 101(X) executes a program loaded from the HDD to the RAM to realize the processing of steps S211 through S216.

Step S201 corresponds to steps S101 through S106 of FIG. 6. Step S202 corresponds to step S107 of FIG. 6.

Furthermore, step S211 corresponds to the processing of the document management server 100 that registers document property information in response to a document registration request transmitted from the multifunction peripheral 102(Y). More specifically, the document registration function 401 issues a document ID and the document property management unit 410 registers the received document property information, security information, and storage destination document ID.

Next, document data acquisition processing is described. When an electronic file is stored and managed in the multifunction peripheral 102(Y), the client terminal 101(X) can download a document from the document management server 100 through the following steps (1) through (6) corresponding to steps (1) through (6) shown in FIG. 8.

<Step (1)>

In step S221 of FIG. 9, the CPU of the client terminal 101(X) activates a web browser to accesses the document management server 100.

In step S212, the CPU of the document management server 100 transmits, to the client terminal 101(X), information relating to documents having property information registered in the document management server 100.

In response to the information, the web browser of the client terminal 101(X) creates a document list screen shown in FIG. 10 and causes the display apparatus to display the document list screen. A user can designate an arbitrary document (e.g., can double click a document with a pointing device) on the document list screen shown in FIG. 10. The web browser causes the display apparatus to display a property information screen shown in FIG. 11.

Then, a user designates an arbitrary document on the screens of FIGS. 10 and 11 to perform document acquisition instruction (i.e., designates a document acquisition button with a pointing device). In step S222, the web browser of the client terminal 101(X) transmits, to the document management server 100, a document data acquisition request of the designated document.

FIG. 10 illustrates an exemplary screen that displays a list of documents registered in the document management server 100.

In FIG. 10, a document designation button 1201 enables a user to put a check mark. When a user clicks a document acquisition button 1202, the web browser transmits a document data acquisition request to the document management server 100 to obtain document data of a document checked by the document designation button 1201.

FIG. 11 illustrates an exemplary screen that displays document property information registered in the document management server 100.

When a user clicks a document acquisition button 1301 shown in FIG. 11 with a pointing device, the web browser transmits a document data acquisition request to the document management server 100 to obtain document data corresponding to the displayed property information.

The document data acquisition request includes a document ID and user information.

<Step (2)>

The CPU of the document management server 100 receives a document data acquisition request. The document information acquisition function 403 confirms the storage type 417 of a document corresponding to a requested document ID with reference to the information stored in the document property management unit 410. If the storage type 417 is "REMOTE", the CPU of the document management server 100 obtains storage destination ID 418, storage destination document ID 419, and security information flag 415.

Furthermore, the CPU of the document management server 100 obtains storage destination URL 432 having the same storage destination ID with reference to the information stored in the storage destination information management unit 430. Next, the document management server 100 sends storage destination URL, storage destination document ID, user information, and security information flag to the web browser of the client terminal 101(X) (refer to step S213). In the present exemplary embodiment, transmission is redirected to the storage destination URL. The present exemplary embodiment uses an HTTP redirect function. The redirect function is shown in FIG. 16.

<Step (3)>

The web browser of the client terminal 101(X) receives the storage destination URL, the storage destination document ID, the user information, and the security information flag. In step S223, the web browser of the client terminal 101(X) automatically transmits, to the storage destination URL, the document ID, the storage destination document ID, the user information, and the security information flag based on the received information.

Thus, a document data acquisition request can be automatically transmitted from the client terminal 101(X) to the multifunction peripheral 102(Y) that stores an electronic file (i.e., entity data of a requested document).

<Step (4)>

The core section 305 of the multifunction peripheral 102(Y) receives the document ID, the storage destination document ID, and the user information. In step S203, the access right inquiry function 502 transmits an access right inquiry to the document management server 100. The access right inquiry includes the document ID and the user information.

<Step (5)>

The CPU of the document management server 100 receives the access right inquiry. The access right management function 402 determines whether a user can access a document having the document ID, based on the document ID and the user information included in the access right inquiry. Then, the CPU of the document management server 100 returns a confirmation result to the multifunction peripheral 102(Y) (refer to step S214).

When the access right management function 402 confirms the accessibility of a user, the CPU of the document management server 100 obtains a storage destination ID based on transmission source information (IP address) of the access right inquiry with reference to the information stored in the storage destination management unit 440.

Then, by referring to the information stored in the document property management unit 410 based on the storage destination ID, the access right management function 402 can confirm whether an inquired document is registered in the multifunction peripheral 102(Y). When a transmission source device of the access right inquiry is not the multifunction peripheral 102(Y) that registered the document, the CPU of the document management server 100 can return a confirmation result "inaccessible."

<Step (6)>

The core section 305 of the multifunction peripheral 102(Y) receives the confirmation result with respect to the access right. If the confirmation result is "accessible", the multifunction peripheral 102(Y) obtains an electronic file corresponding to the storage destination document ID with reference to the information stored in the electronic document file storage unit 510.

Then, the core section 305 of the multifunction peripheral 102(Y) transmits the obtained electronic file to the web browser of the client terminal 101(X) (refer to step S204). If the confirmation result is "inaccessible", the multifunction peripheral 102(Y) informs the web browser of the client terminal 101(X) of absence of the access right.

The electronic document file storage unit 510 in the multifunction peripheral 102(Y) can store a plurality of electronic files. In this case, a single document can be divided into plural electronic files depending on the resolution. Moreover, a single document can be divided into plural electronic files depending on the number of gradation. Additionally, a single document can be divided into plural electronic files depending on the size of image.

When plural electronic files are provided for a single document, an electronic file obtained from the electronic document file storage unit 510 of the multifunction peripheral 102(Y) can be differentiated depending on the resolution of the client terminal 101(X) that requested the document. For example, if a document request is received from the client terminal 101(X) equipped with a display apparatus having higher resolution, the multifunction peripheral 102(Y) can select an electronic file having higher resolution.

If a document request is received from the client terminal 101(X) connected via a communication line having slower communication speed, the multifunction peripheral 102(Y) can select an electronic file having lower resolution. If desirable, a user of the client terminal 101(X) can designate the size of an electronic file to be obtained.

Through the above-mentioned processes, the client terminal 101(X) can obtain an electronic file.

The multifunction peripheral 102(Y) transmits (uploads) an electronic file stored in the electronic document file storage unit 510 to the document management server 100, at above-mentioned specific timing, if the processing load of the multifunction peripheral 102(Y) is not heavy. Then, the multifunction peripheral 102(Y) requests the document management server 100 to register the document (refer to step S205). The registration request of an electronic file includes storage destination document ID 511 corresponding to the electronic file.

The CPU of the document management server 100 receives the registration request of an electronic file (document entity data) from the multifunction peripheral 102(Y). The electronic document data management unit 420 registers an electronic file included in the registration request.

More specifically, the CPU of the document management server 100 receives a document registration request from the multifunction peripheral 102(Y) and executes the processing of step S215. The CPU of the document management server 100 obtains a document ID corresponding to a storage destination ID included in the document registration request, with reference to the information stored in the document property management unit 410.

Then, the document registration function 401 causes the electronic document data management unit 420 to register the obtained document ID and the received electronic file. Furthermore, the document registration function 401 causes the document property management unit 410 to register "LOCAL" in the storage type 417 corresponding to the obtained document ID.

As described above, an electronic file (i.e., entity of document) can be registered in the document management server 100 in response to an electronic file registration request sent from the multifunction peripheral 102(Y).

According to the aforementioned step (4), the multifunction peripheral 102(Y) sends an access right inquiry to the document management server 100 about a requested document. Accordingly, even if a user of the client terminal 101(X) directly accesses the multifunction peripheral 102(Y) to obtain an electronic file of an intended document, the electronic file (i.e., entity of document) can be downloaded according to the access right managed by the document management server 100. Consequently, an unauthorized user cannot access the document data stored in the multifunction peripheral 102(Y).

As described above, the multifunction peripheral 102(Y) or the image processing apparatus transmits only the document property information to the document management server 100 for document registration and stores the document data itself in its storage. Furthermore, if the property information of a document requested by the client terminal 101(X) is already registered, the document management server 100 transmits, to client terminal 101(X), information relating to the image processing apparatus that stored the document data. Then, based on information of the image processing apparatus storing the document data, the client terminal 101(X) sends an inquiry to the image processing apparatus storing the document data.

Additionally, the image processing apparatus requests the document management server 100 to confirm the access right according to the inquiry of the client terminal 101(X). Then, based on the confirmation result, the image processing apparatus determines whether the document data can be transmitted to the client terminal 101(X).

Furthermore, the image processing apparatus transmits, to the document management server 100, the document data stored and managed in the image processing apparatus if the processing load is not heavy.

As apparent from the aforementioned arrangement, performance of the image processing apparatus does not deteriorate during the transmission processing for registering a document to the document management system. A user can operate the image processing apparatus for an intended job without being interrupted by the document registration processing.

In addition, the image processing apparatus can control access to an electronic file (i.e., document entity data) stored in its storage unit with reference to the access right managed by the document management server.

Second Exemplary Embodiment

The above-mentioned first exemplary embodiment has described the processing for controlling access to an electronic file stored in an image processing apparatus based on access right managed by a document management system.

A second exemplary embodiment describes processing for controlling an access to an electronic file stored in an image processing apparatus based on access right and security information (e.g., password) managed by a document management system.

Figure 12:
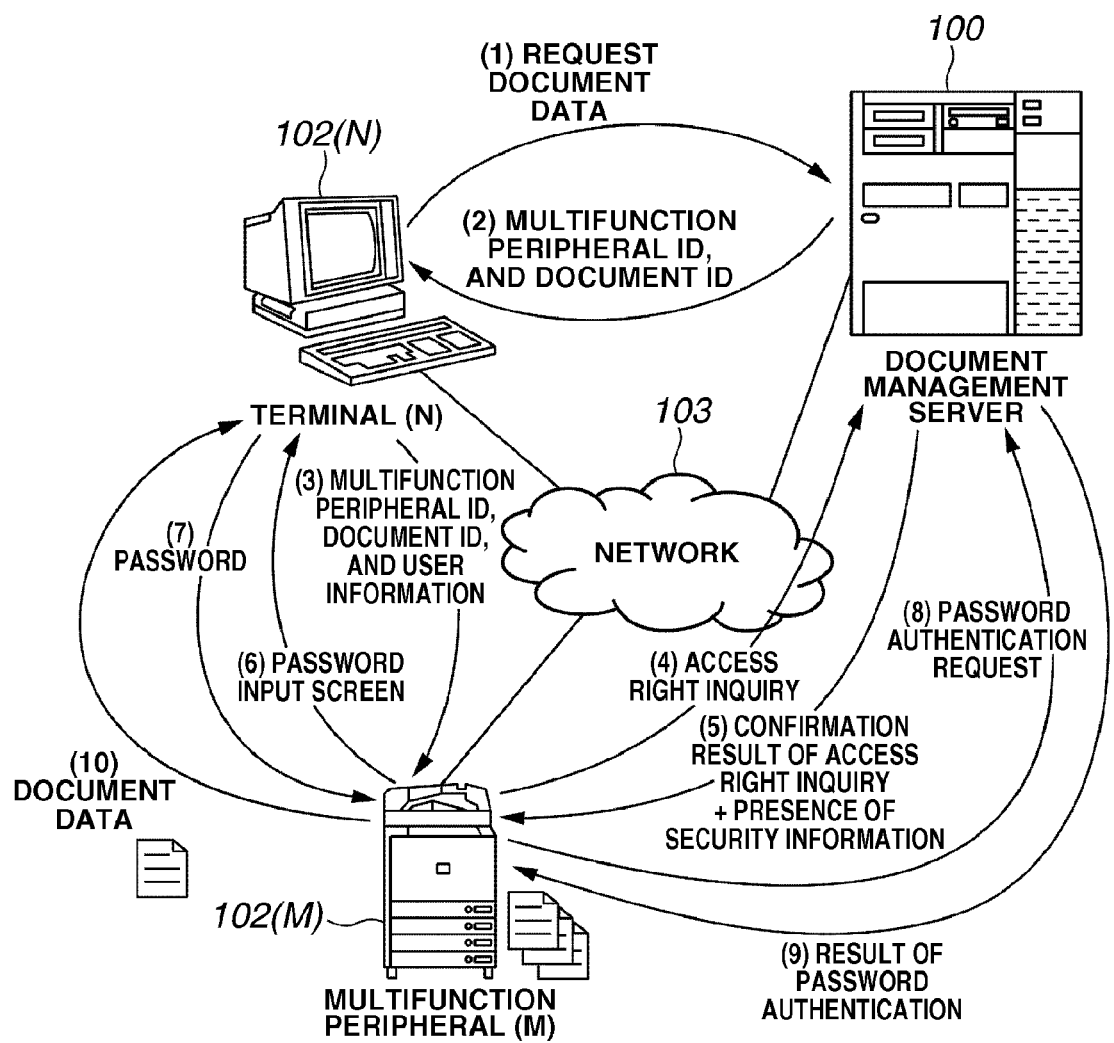
FIG. 12 is a conceptual diagram illustrating processing for obtaining via the document management server an electronic file stored and managed in the multifunction peripheral (i.e., image processing apparatus) according to a second exemplary embodiment.
Figure 13:
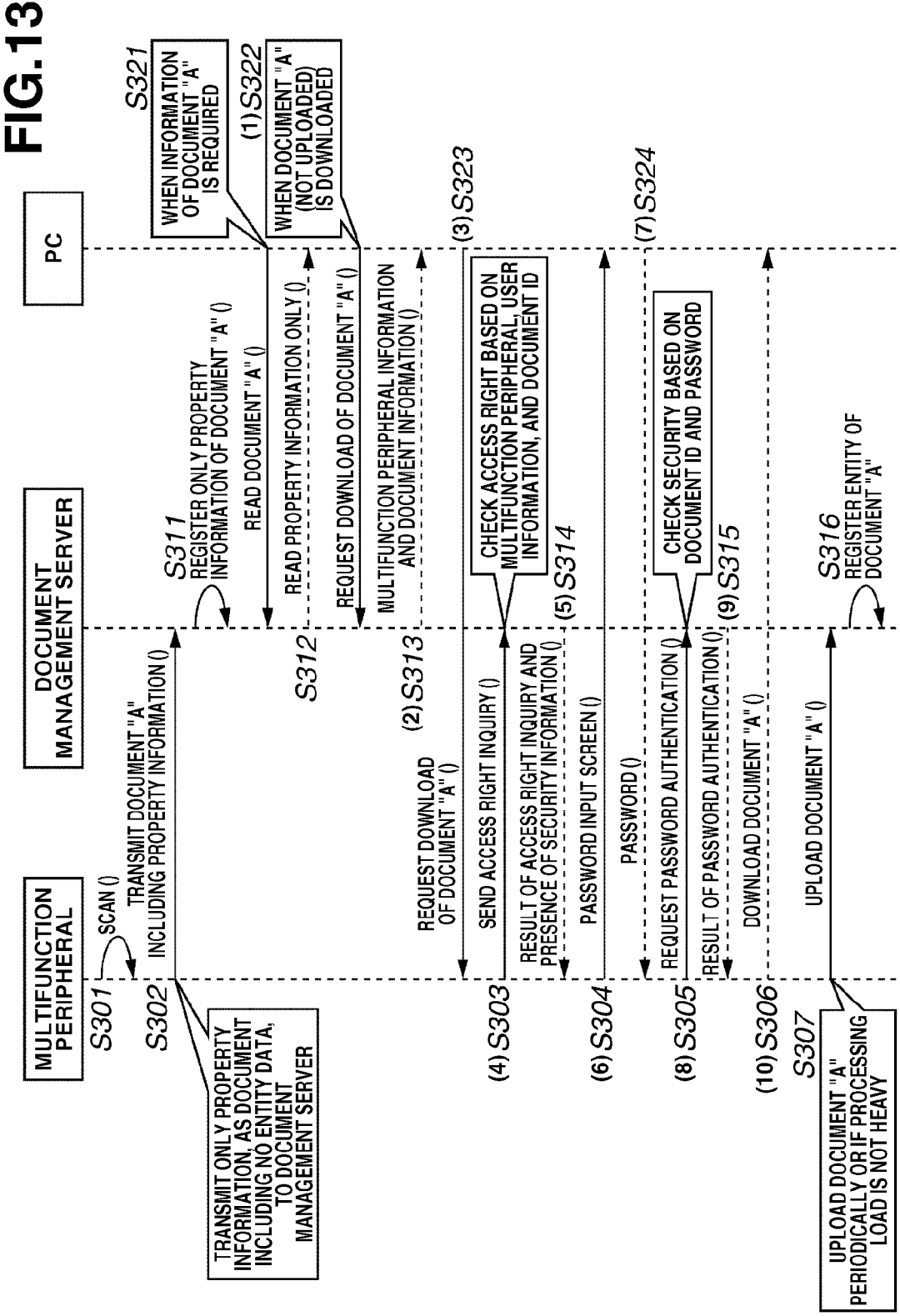
FIG. 13 is a sequence diagram illustrating an example of a control processing procedure according to an exemplary embodiment.
Figure 15:
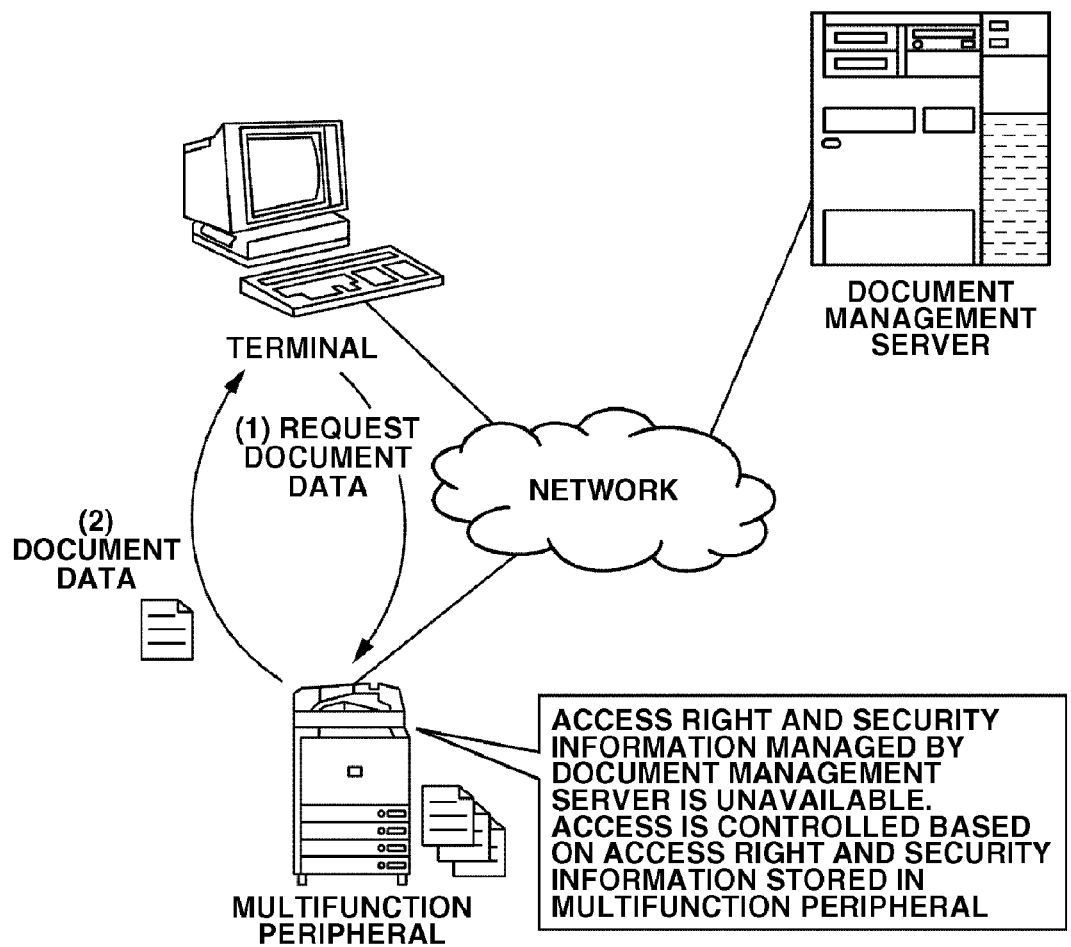
FIG. 15 is an illustration of a conventional technique (URL-send function) for accessing an electronic file stored in the image processing apparatus.

FIGS. 12 and 13 illustrate detailed processing for obtaining an electronic file stored and managed in the multifunction peripheral (i.e., image processing apparatus) 102(Y) via the document management server 100 according to the second exemplary embodiment.

FIG. 12 is a conceptual diagram illustrating the processing for obtaining via the document management server 100 an electronic file stored and managed in the multifunction peripheral (i.e., image processing apparatus) 102(Y) according to the second exemplary embodiment.

FIG. 13 is a sequence diagram illustrating an example of a control processing procedure according to the present exemplary embodiment, corresponding to the processing for obtaining via the document management server 100 an electronic file stored and managed in the multifunction peripheral (i.e., image processing apparatus) 102(Y).

The multifunction peripheral 102(Y) executes the processing of steps S301 through S307. The CPU of the core section 305 reads a program from the ROM and executes the program for realizing the processing of steps S301 through S307. The document management server 100 executes the processing of steps S311 through S316.

The CPU of the document management server 100 executes a program loaded from the HDD to the RAM to realize the processing of steps S311 through S316. Furthermore, the client terminal 101(X) executes the processing of steps S321 through S324. The CPU of the client terminal 101(X) executes a program loaded from the HDD to the RAM to realize the processing of steps S321 through S324.

Steps S301, S302, and S311 are similar to steps S201, S202, and S211 of FIG. 9 and will not be described below.

Next, document data acquisition processing is described. When an electronic file is stored and managed in the multifunction peripheral 102(Y), the client terminal 101(X) can download a document from the document management server 100 through the following steps (1) through (6) corresponding to steps (1) through (6) shown in FIG. 12.

<Step (1)>

In step S321 of FIG. 13, the CPU of the client terminal 101(X) activates a web browser to accesses the document management server 100.

In step S312, the CPU of the document management server 100 transmits, to the client terminal 101(X), information relating to documents having property information registered in the document management server 100.

In response to the information, the web browser of the client terminal 101(X) creates a document list screen shown in FIG. 10 and causes the display apparatus to display the document list screen. A user can designate an arbitrary document (e.g., can double click a document with a pointing device) on the document list screen shown in FIG. 10. The web browser causes the display apparatus to display a property information screen shown in FIG. 11.

Then, a user designates an arbitrary document on the screens of FIGS. 10 and 11 to perform document acquisition instruction (i.e., designates a document acquisition button with a pointing device). In step S322, the web browser of the client terminal 101(X) transmits, to the document management server 100, a document data acquisition request of the designated document.

The document data acquisition request includes a document ID and user information.

<Step (2)>

The CPU of the document management server 100 receives a document data acquisition request. The document information acquisition function 403 confirms the storage type 417 of a document corresponding to a requested document ID with reference to the information stored in the document property management unit 410.

If the storage type 417 is "REMOTE", the CPU of the document management server 100 obtains storage destination ID 418, storage destination document ID 419, and security information flag 415. Furthermore, the CPU of the document management server 100 obtains storage destination URL 432 having the same storage destination ID with reference to the information stored in the storage destination information management unit 430.

Next, the document management server 100 sends storage destination URL, storage destination document ID, user information, and security information flag to the web browser of the client terminal 101(X) (refer to step S313). In the present exemplary embodiment, transmission is redirected to the storage destination URL. The present exemplary embodiment uses an HTTP redirect function. The redirect function is shown in FIG. 16.

<Step (3)>

The web browser of the client terminal 101(X) receives the storage destination URL, the storage destination document ID, the user information, and the security information flag. In step S323, the web browser of the client terminal 101(X) automatically transmits, to the storage destination URL, the document ID, the storage destination document ID, the user information, and the security information flag based on the received information.

Thus, a document data acquisition request can be automatically transmitted from the client terminal 101(X) to the multifunction peripheral 102(Y) that stores an electronic file (i.e., entity data of a requested document).

<Step (4)>

The core section 305 of the multifunction peripheral 102(Y) receives the document ID, the storage destination document ID, and the user information. In step S303, the access right inquiry function 502 transmits an access right inquiry to the document management server 100. The access right inquiry includes the document ID and the user information.

<Step (5)>

The CPU of the document management server 100 receives the access right inquiry. The access right management function 402 determines whether a user can access a document having the document ID, based on the document ID and the user information included in the access right inquiry. Then, the CPU of the document management server 100 returns a confirmation result to the multifunction peripheral 102(Y) (refer to step S314).

When the access right management function 402 confirms the accessibility of a user, the CPU of the document management server 100 obtains a storage destination ID based on transmission source information (IP address) of the access right inquiry with reference to the information stored in the storage destination management unit 440.

Then, by referring to the information stored in the document property management unit 410 based on the storage destination ID, the access right management function 402 can confirm whether an inquired document is registered in the multifunction peripheral 102(Y). When a transmission source device of the access right inquiry is not the multifunction peripheral 102(Y) that registered the document, the CPU of the document management server 100 can return a confirmation result "inaccessible."

<Step (6)>

The core section 305 of the multifunction peripheral 102(Y) receives the result with respect to the access right. If the confirmation result is "accessible", the multifunction peripheral 102(Y) executes the processing of step S304. In step S304, the core section 305 of the multifunction peripheral 102(Y) causes the web browser of the client terminal 101(X) to display a security information input screen (not shown) to let a user input a password. If the confirmation result is "inaccessible", the multifunction peripheral 102(Y) informs the web browser of the client terminal 101(X) of absence of the access right.

<Step (7)>

The web browser of the client terminal 101(X) displays the security information input screen. A user inputs a password. Then, the web browser of the client terminal 101(X) transmits, to multifunction peripheral 102(Y), password information obtained from the user.

<Step (8)>

The multifunction peripheral 102(Y) receives the password information. The access right inquiry function 502 transmits a security information inquiry to the document management server 100. In this case, the security information inquiry includes a document ID and the password information.

<Step (9)>

The CPU of the document management server 100 receives the security information inquiry. The access right management function 402 checks information stored in the document property management unit 410 with reference to the document ID and the password information included in the security information inquiry. The access right management function 402 compares the received password with a password stored in the document property management unit 410. Then, the CPU of the document management server 100 transmits the comparison result to the multifunction peripheral 102(Y) (refer to step S315).

<Step (10)>

The core section 305 of the multifunction peripheral 102(Y) receives the confirmation result with respect to the access right. If the confirmation result is "accessible", the multifunction peripheral 102(Y) obtains an electronic file corresponding to the storage destination document ID with reference to the information stored in the electronic document file storage unit 510.

Then, the core section 305 of the multifunction peripheral 102(Y) transmits the obtained electronic file to the web browser of the client terminal 101(X) (refer to step S306). If the confirmation result is "inaccessible", the multifunction peripheral 102(Y) informs the web browser of the client terminal 101(X) of absence of the access right.

The electronic document file storage unit 510 in the multifunction peripheral 102(Y) can store a plurality of electronic files. In this case, a single document can be divided into plural electronic files depending on the resolution. Moreover, a single document can be divided into plural electronic files depending on the number of gradation. Additionally, a single document can be divided into plural electronic files depending on the size of image.

When plural electronic files are provided for a single document, an electronic file obtained from the electronic document file storage unit 510 of the multifunction peripheral 102(Y) can be differentiated depending on the resolution of the client terminal 101(X) that requested the document. For example, if a document request is received from the client terminal 101(X) equipped with a display apparatus having higher resolution, the multifunction peripheral 102(Y) can select an electronic file having higher resolution.

If a document request is received from the client terminal 101(X) connected via a communication line having slower communication speed, the multifunction peripheral 102(Y) can select an electronic file having lower resolution. If desirable, a user of the client terminal 101(X) can designate the size of an electronic file to be obtained.

As described above, the client terminal 101(X) can obtain an electronic file.

The multifunction peripheral 102(Y) transmits (uploads) an electronic file stored in the electronic document file storage unit 510 to the document management server 100 when the processing load of the multifunction peripheral 102(Y) is not heavy. Then, the multifunction peripheral 102(Y) requests the document management server 100 to register the document (refer to step S306). The registration request of an electronic file includes storage destination document ID 511 corresponding to the electronic file.

The CPU of the document management server 100 receives the registration request of an electronic file (document entity data) from the multifunction peripheral 102(Y), at above-mentioned specific timing. The electronic document data management unit 420 registers an electronic file included in the registration request.

More specifically, the CPU of the document management server 100 receives a document registration request from the multifunction peripheral 102(Y) and executes the processing of step S316. The CPU of the document management server 100 obtains a document ID corresponding to a storage destination ID included in the document registration request, with reference to the information stored in the document property management unit 410.

Then, the document registration function 401 causes the document property management unit 410 to update the storage type 417 corresponding to the obtained document ID from "REMOTE" to "LOCAL". Furthermore, the document registration function 401 causes the electronic document data management unit 420 to register the obtained document ID and the received electronic file.

As described above, an electronic file (i.e., entity of document) can be registered in the document management server 100 in response to an electronic file registration request sent from the multifunction peripheral 102(Y).

According to the aforementioned step (4), the multifunction peripheral 102(Y) sends an access right inquiry to the document management server 100. According to step (7), the security of a requested document can be improved by executing the security information inquiry requested from the multifunction peripheral 102(Y) to the document management server 100.

A time lag may be caused between the timing an electronic file is registered in the electronic document file storage unit 510 of the multifunction peripheral 102(Y) and the timing the document is registered in the document management server 100. In this case, the electronic document file storage unit 510 of the multifunction peripheral 102(Y) can manage security information to prevent an unauthorized user from directly accessing the multifunction peripheral 102(Y) to obtain an electronic file.

According to the processing of FIGS. 12 and 13, the access right of a user is first confirmed and then the user inputs a password. However, the processing of FIGS. 12 and 13 can be modified so that a user can input a password before the access right is confirmed. Alternatively, only the password can be confirmed.

Furthermore, in the processing of step S323 (refer to (4) of FIG. 12), a user can input a password and the client terminal 101(X) transmits the password to the multifunction peripheral 102(Y).

An electronic file in the multifunction peripheral 102(Y) registered to the document management server 100 is not limited to a document image entered by a scanner. For example, an electronic file entered via the network I/F section 310 or the facsimile section 306, or a recording medium (not shown), can be registered to the document management server 100.

As described above, in addition to the effect of the aforementioned first exemplary embodiment, the present exemplary embodiment can control access to an electronic file stored in an image processing apparatus with reference to security information (e.g., password) managed by the document management system.

Configuration and contents of the above-mentioned various data are not limited and can be variously modified with reference to the use and the purpose.

The present invention is not limited to the above-described exemplary embodiments. For example, the present invention can be embodied as a system, an apparatus, a method, a software program or a storage medium. The present invention can be applied to a system including a plurality of devices or a single apparatus.

A memory map shown in FIG. 14 can be referred to as an arrangement of a storage medium capable of storing various data processing programs, which are readable by the document management system according to an exemplary embodiment.

FIG. 14 is an illustration of a memory map of a storage medium (recording medium) storing various data processing programs readable and executable by devices (e.g., document management server 100, multifunction peripheral 102(Y), and client terminal 101(X)) forming a document management system according to an exemplary embodiment.

Although not shown in the drawing, information for managing program groups stored in a storage medium, including version information and creators, can be stored. Furthermore, information depending on an operating system (OS) reading the programs, e.g., icons identifying respective programs, can be also stored.

Furthermore, directories of the above-described storage medium can manage data belonging to various programs. An installation program for various programs and an extraction program for compressed programs can be also stored.

The functions of the processing shown in FIGS. 6, 9 and 13 of the above-mentioned exemplary embodiments can be realized by installing programs to a host computer. The information including the programs can be supplied to an output apparatus from an external storage medium, using a storage medium (e.g., CD-ROM, flash memory, or FD) or via a network.

Furthermore, software program code for realizing the functions of the above-described exemplary embodiments can be supplied, via a storage medium, to a system or an apparatus connected to various devices. A computer (or CPU or microprocessing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses the means for supplying the program code to a computer, such as a storage (or recording) medium storing the program code.

In this case, the type of program can be any one of object code, interpreter program, and OS script data. A storage medium supplying the program can be selected from any one of a flexible (floppy) disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Furthermore, enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Furthermore, an operating system (OS) or other application software running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be applied to a system including plural devices or can be applied to a single apparatus. Moreover, the present invention can be realized by supplying the program(s) to a system or an apparatus. In this case, the system or the apparatus can read the software program relating to the present invention from a storage medium.

As described above, the present invention enables an image processing apparatus (e.g., image processing apparatus) to scan an electronic file and manage the scanned file in the image processing apparatus without transmitting the file to a document management server. The image processing apparatus transmits only the document property information to the document management server. Furthermore, the image processing apparatus can later transmit the stored electronic file to the document management server when the processing load is not heavy.

Thus, when an electronic file obtained by an image processing apparatus is registered to a document management server, performance of the image processing apparatus does not deteriorate due to transmission of the electronic file from the image processing apparatus to the document management server Moreover, the image processing apparatus can store and manage an electronic file as a document managed by a document management server with reference to the same access right effective in both the image processing apparatus and the document management server.

As described above, according to the present exemplary embodiments, an image processing apparatus can temporarily store entity data of a scanned document and transmit the stored document entity data to a document management server when the processing load of the image processing apparatus is not heavy.

As a result, performance of the image processing apparatus does not deteriorate during the transmission processing for registering a document to the document management server. A user can operate the image processing apparatus for an intended job without being interrupted by the document registration processing.

In addition, the image processing apparatus can control access to entity data stored in its storage unit with reference to the accessibility managed by the document management server.

Therefore, the present invention can prevent the performance of an image processing apparatus from deteriorating due to document registration processing, and can assure security of entity data managed by the image processing apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-014924 filed Jan. 24, 2006, which is hereby incorporated by reference herein in its entirety.

What is claimed is:

1. A document management server configured to communicate with an image processing apparatus and a client apparatus via a communication medium, and manage a document read by the image processing apparatus, the document management server comprising:

a management unit configured to manage a first document of which document entity data and document property information are stored in the document management server, wherein the entity data and the property information are managed in correlation with each other, and a second document of which document entity data is not stored in the document management server but stored in the image processing apparatus that reads the document and of which document property information and information indicating a place where the entity data is stored are stored in the document management server, wherein the property information and the information indicating a place where the entity data is stored are managed in correlation with each other by discriminating each other;

a receiving unit configured to receive a document registration request for requesting registration of the document read by the image processing apparatus as an object managed by the management unit, the document registration request including at least the document property information;

a registration unit configured to register the property information and the document entity data such that the document, which is registered as an object managed by the management unit according to the document registration request, is managed by the management unit as the first document when the document entity data, in addition to the document property information, is included in the registration request, and to register the property information, information indicating the storage destination of the document entity data in the image processing apparatus where the document entity data is stored, and information for determining authority to the document entity data such that the document, which is registered as the object managed by the management unit according to the document registration request, is managed by the management unit as the second document when the document entity data is not included in the document registration request;

a first reply unit configured to receive a request from the client apparatus that requires the document entity data of the second document registered in the registration unit and transmit information indicating a storage destination of the document entity data to the client apparatus; and a second reply unit configured to receive, from the image processing apparatus storing the document entity data of the document, inquiry information about authority to the document entity data of the second document registered in the registration unit, and determine authority to the document entity data of the second document with reference to information for determining authority to the registered document based on the inquiry information, and transmit the determined authority to the image processing apparatus.

2. The document management server according to claim 1, wherein the information required for determining authority to the document entity data of the second document is access right information of each user, wherein the second reply unit determines authority to the document entity data of the second document with reference to information for determining authority to the registered document based on the user information included in the inquiry information and transmits the determined authority to the image processing apparatus.

3. The document management server according to claim 1, wherein the information required for determining authority to the document entity data of the second document is password information, wherein the second reply unit determines authority to the document entity data of the second document with reference to information for determining authority to the registered document based on the password information included in the inquiry information and transmits the determined authority to the image processing apparatus.

4. The document management server according to claim 1, wherein the first reply unit transmits, to the client apparatus, the information indicating the storage destination of the requested document entity data of the second document, and controls the client apparatus to execute an inquiry to the storage destination of the requested document entity data of the second document.

5. The document management server according to claim 1, further comprising an obtaining unit configured to obtain, from address information of a transmission source of the document registration request, identification information for identifying the image processing apparatus storing the document entity data requested in the document registration request, wherein the registration unit registers the identification information in addition to the information included in the document registration request when the document entity data is not included in the document registration request, and wherein the first reply unit transmits the identification information in addition to the information indicating the storage destination of the document entity data to the client apparatus.

6. The document management server according to claim 1, wherein if the document entity data of the second document is requested by the client apparatus, the first reply unit transmits the information indicating the storage destination of the document entity data to the client apparatus, and if the document entity data of the second document is requested by the client apparatus, the first reply unit transmits the document entity data of the first document to the client apparatus.

7. A method performed in a document management server that is configured to communicate with an image processing apparatus and a client apparatus via a communication medium, and manage a document read by the image processing apparatus, the method comprising:

managing a first document of which document entity data and document property information are stored in the document management server, wherein the entity data and the property information are managed in correlation with each other, and a second document of which document entity data is not stored in the document management server but stored in the image processing apparatus that reads the document and of which document property information and information indicating a place where the entity data is stored are stored in the document management server, wherein the property information and the information indicating a place where the entity data is stored are managed in correlation with each other by discriminating each other;

receiving a document registration request for requesting registration of the document read by the image processing apparatus as an object managed by the management unit, the document registration request including at least the document property information;

registering the property information and the document entity data such that the document, which is registered as an object managed by the management unit according to the document registration request, is managed by the management unit as the first document when the document entity data, in addition to the document property information, is included in the registration request, and to register the property information, information indicating the storage destination of the document entity data in the image processing apparatus where the document entity data is stored, and information for determining authority to the document entity data such that the document, which is registered as the object managed by the management unit according to the document registration request, is managed by the management unit as the second document when the document entity data is not included in the document registration request;

receiving a request from the client apparatus that requires the document entity data of the second document and transmitting information indicating a storage destination of the document entity data to the client apparatus; and receiving, from the image processing apparatus storing the document entity data of the document, inquiry information about accessibility to the registered document entity data of the second document corresponding to the registered property information, and determining accessibility to the document entity data of the second document with reference to information for determining accessibility to the registered document based on the inquiry information, and transmitting the determined accessibility to the image processing apparatus.

8. A computer-readable storage medium storing a program that when executed by a document management server that is configured to communicate with an image processing apparatus and a client apparatus, and manage a document read by the image processing apparatus, causes the document management server to perform operations comprising:

managing a first document of which document entity data and document property information are stored in the document management server, wherein the entity data and the property information are managed in correlation with each other, and a second document of which document entity data is not stored in the document management server but stored in the image processing apparatus that reads the document and of which document property information and information indicating a place where the entity data is stored are stored in the document management server, wherein the property information and the information indicating a place where the entity data is stored are managed in correlation with each other by discriminating each other;

receiving a document registration request for requesting registration of the document read by the image processing apparatus as an object managed by the management unit, the document registration request including at least the document property information;

registering the property information and the document entity data such that the document, which is registered as an object managed by the management unit according to the document registration request, is managed by the management unit as the first document when the document entity data, in addition to the document property information, is included in the registration request, and to register the property information, information indicating the storage destination of the document entity data in the image processing apparatus where the document entity data is stored, and information for determining authority to the document entity data such that the document, which is registered as the object managed by the management unit according to the document registration request, is managed by the management unit as the second document when the document entity data is not included in the document registration request;

receiving a request from the client apparatus that requires the document entity data of the second document and transmitting information indicating a storage destination of the document entity data to the client apparatus; and receiving, from the image processing apparatus storing the document entity data of the document, inquiry information about accessibility to the registered document entity data of the second document corresponding to the registered property information, and determining accessibility to the document entity data of the second document with reference to information for determining accessibility to the registered document based on the inquiry information, and transmitting the determined accessibility to the image processing apparatus.

* * * * *